(12) United States Patent
Geffen

(10) Patent No.: US 10,640,135 B1
(45) Date of Patent: May 5, 2020

(54) COLLAPSIBLE LOCOMOTION PLATFORM WITH SELECTIVELY ARRESTABLE WHEEL ASSEMBLY

(71) Applicant: Yuval Geffen, Nir Banim (IL)

(72) Inventor: Yuval Geffen, Nir Banim (IL)

(*) Notice: Subject to any disclaimer, the term of this patent is extended or adjusted under 35 U.S.C. 154(b) by 0 days.

(21) Appl. No.: 16/561,268

(22) Filed: Sep. 5, 2019

(30) Foreign Application Priority Data

Apr. 11, 2019 (IL) .......................................... 265994

(51) Int. Cl.
*B62B 5/00* (2006.01)
*B62B 3/02* (2006.01)

(52) U.S. Cl.
CPC ............. *B62B 5/0003* (2013.01); *B62B 3/02* (2013.01); *B62B 2203/70* (2013.01); *B62B 2301/05* (2013.01); *B62B 2301/10* (2013.01)

(58) Field of Classification Search
CPC ..... B62B 5/0003; B62B 3/02; B62B 2203/70; B62B 2301/05; B62B 2301/10
See application file for complete search history.

(56) References Cited

U.S. PATENT DOCUMENTS

| | | | |
|---|---|---|---|
| 3,669,031 A * | 6/1972 | Cole ..................... | A47B 3/00 108/102 |
| 4,953,878 A | 9/1990 | Sbragia | |
| 5,649,718 A | 7/1997 | Groglio | |
| 5,772,236 A * | 6/1998 | Clark ....................... | B62B 3/02 280/43 |
| 6,045,150 A | 4/2000 | Al-Toukhi | |
| 6,067,698 A * | 5/2000 | Silvera-Langley .... | A47G 19/08 220/573.3 |
| 6,070,899 A * | 6/2000 | Gines ..................... | B62B 3/027 280/651 |
| 8,408,581 B1* | 4/2013 | Hunter .................... | B62B 3/027 280/33.993 |
| 9,126,610 B1* | 9/2015 | Abiri ..................... | B62B 5/0003 |
| 9,849,582 B2* | 12/2017 | Cheff ....................... | B25H 1/04 |
| 10,131,373 B1* | 11/2018 | Ness ........................ | B60R 5/04 |

(Continued)

FOREIGN PATENT DOCUMENTS

| | | |
|---|---|---|
| DE | 2651039 A1 | 5/1978 |
| DE | 19514912 A1 | 10/1996 |

(Continued)

*Primary Examiner* — Erez Gurari
(74) *Attorney, Agent, or Firm* — Dorsey & Whitney LLP

(57) ABSTRACT

A locomotion platform comprising: a base frame having front and rear lowermost sections, both defining an imaginary horizontal landing plane; front and rear wheel assemblies, each configured with a distal end comprising riding wheel(s) and at least one proximal end articulated to said base frame, each of said front and rear wheel assemblies independently manipulable between a collapsed position, at which the riding wheels of the respective wheel assembly are disposed on or above the plane, and an extended position, at which the riding wheels of the respective wheel assembly are disposed below the plane; a position fixing mechanism(s) configured to selectively arrest at least one of said front or rear wheel assemblies at one or more intermediate positions between the collapsed and extended positions; and an activating module(s) configured to induce manipulation of at least one of said front or rear wheel assemblies towards the collapsed position.

20 Claims, 18 Drawing Sheets

(56) References Cited

U.S. PATENT DOCUMENTS

| | | | |
|---|---|---|---|
| 10,232,867 B1* | 3/2019 | Jones | B62B 3/022 |
| 2002/0149176 A1* | 10/2002 | Miller | B62B 3/027 |
| | | | 280/651 |
| 2005/0173878 A1 | 8/2005 | Espejo et al. | |
| 2008/0093827 A1 | 4/2008 | Silberberg | |
| 2008/0303248 A1* | 12/2008 | Chaparro | B62B 3/027 |
| | | | 280/651 |
| 2010/0140887 A1* | 6/2010 | Yehiav | B62B 5/0003 |
| | | | 280/33.991 |
| 2010/0230934 A1 | 9/2010 | Fine | |
| 2010/0320732 A1* | 12/2010 | Dobrachinski | B62B 3/027 |
| | | | 280/651 |
| 2011/0169235 A1 | 7/2011 | Moster | |
| 2014/0140797 A1 | 5/2014 | Howe | |
| 2014/0369801 A1 | 12/2014 | Beauchamp et al. | |
| 2016/0200340 A1* | 7/2016 | Stankevitz | B62B 5/0003 |
| | | | 280/641 |
| 2016/0347341 A1* | 12/2016 | Tauber | B62B 3/027 |
| 2017/0088154 A1* | 3/2017 | Lin | B62B 3/022 |
| 2017/0355389 A1* | 12/2017 | Stewart | A61G 1/04 |
| 2018/0009461 A1* | 1/2018 | Rucker | B62B 3/022 |
| 2019/0031221 A1* | 1/2019 | Atsumi | B61B 13/00 |
| 2019/0193503 A1* | 6/2019 | Beylin | B60G 11/00 |
| 2019/0302775 A1* | 10/2019 | Palan | B62B 3/14 |

FOREIGN PATENT DOCUMENTS

| | | |
|---|---|---|
| DE | 19611542 A1 | 9/1997 |
| DE | 19812119 A1 | 9/1999 |
| DE | 102005049421 A1 | 4/2006 |
| DE | 202010014136 U1 | 2/2011 |
| EP | 1180463 A1 | 2/2002 |
| EP | 1245212 A1 | 10/2002 |
| FR | 2775645 A1 | 9/1999 |
| GB | 2471109 A | 12/2010 |
| WO | 2005028277 A1 | 3/2005 |
| WO | 2010001398 A1 | 1/2010 |
| WO | 2011065808 A1 | 6/2011 |
| WO | 2015188321 A1 | 12/2015 |
| WO | 2017037702 A1 | 3/2017 |

\* cited by examiner

COLLAPSIBLE LOCOMOTION PLATFORM WITH SELECTIVELY ARRESTABLE WHEEL ASSEMBLY

TECHNOLOGICAL FIELD

The presently disclosed subject matter relates to a collapsible locomotion platform configurable between a collapsed and extended positions.

BACKGROUND

Currently, when we need to load and unload objects from a trunk of a car, we must lift them manually. This operation requires some amount of strength, especially when the objects are too heavy or too large for us to carry. Several solutions were offered in the prior art for collapsible carts and locomotion platforms. One example is disclosed in WO2017/037702, related to a cart and a locomotion platform comprising a front wheel assembly and a rear wheel assembly, articulated to said locomotion platform and collapsible upon engaging a barrier. Another example is disclosed in FR2775645 related to an automatic mechanism for folding trolley wheels enabling it to be put into an automobile.

DE 2651039 discloses a transfer trolley for a delivery vehicle which has rollers mounted on a bottom of a frame thereof with folding adjustable legs having wheels. DE102005049421 discloses a shopping cart rolling on casters, with a reducible for better stowage in the luggage compartment of a vehicle. EP1245212 discloses a Carriage for a stretcher, having two stand legs fitted with wheels and a mechanism for controlling the unfolding and folding of each stand leg. DE19514912 discloses a transporting trolley having two rollers below the front narrow site of the body bottom and retractable running wheels. The front running wheels can be retracted by the wheel carrier so that the trolley can be run onto the loading surface of the vehicle on the rollers and pushed well onto it.

GENERAL DESCRIPTION

According to an aspect of the presently disclosed subject matter, there is provided a locomotion platform comprising:

a base frame having a front lowermost section and a rear lowermost section, both defining an imaginary horizontal landing plane;

a front wheel assembly and a rear wheel assembly, each configured with a distal end comprising one or more riding wheels and at least one proximal end articulated to said base frame, each one of said front wheel assembly and said rear wheel assembly being independently manipulable between a collapsed position, at which the riding wheels of the respective wheel assembly are disposed on or above the horizontal landing plane, and an extended position, at which the riding wheels of the respective wheel assembly are disposed below the horizontal landing plane;

at least one position fixing mechanism configured to selectively arrest at least one of said front wheel assembly and said rear wheel assembly at any one of one or more intermediate positions between the collapsed position and the extended position; and at least one activating module configured to induce manipulation of at least one of said front wheel assembly and said rear wheel assembly towards the collapsed position.

The locomotion platform of the presently disclosed subject matter can be collapsible and extendable by manipulation of the front and rear wheels assemblies thereof between their collapsed and extended positions. This manipulation can occur in an automated or a semi-automated manner so as to be mounted on or deployed from a barrier top surface (e.g. a top surface of a trunk of a vehicle), while maintaining the horizontal landing plane of the base frame on substantially parallel to the barrier top surface as a result of the operation of the position fixing mechanism.

According to a particular example, the locomotion platform at any one of the intermediate positions and the extended position of the front and rear wheels assemblies can be mounted from a riding surface (e.g. the ground) onto the barrier top surface, having a first barrier height defined as a height difference between the barrier top surface and the riding surface. The mounting of the locomotion platform onto the barrier top surface can be provided by pushing the locomotion platform towards the barrier top surface, resulting with the manipulation of the front and rear wheels assemblies towards the collapsed position, at which the horizontal landing plane is to be disposed on top of the barrier top surface.

While mounted on top of the barrier top surface, the collapsed locomotion platform can be transported from place to place (e.g. when the barrier top surface is a part of a vehicle being driven from a first place to a second place). As a result of this transportation, as well as other causes such as wheels pressure change, heavy load etc., the barrier height can be changed to a second barrier height, which is either greater or smaller than the first barrier height. For example, the barrier height can change between mounting the locomotion platform from the riding surface without a sidewalk, having a first barrier height with respect to the barrier top surface and deploying the locomotion platform onto the riding surface with a sidewalk, having a smaller second barrier height. In light of this height change, there is still a need to assure that the locomotion platform is safely deployed from the barrier top surface and safely extended and arrested upon engaging the riding surface regardless the above described height change. The safe deployment can be enabled by the position fixing mechanism of the locomotion platform, which allows arresting the front and rear wheels assemblies at different intermediate positions between the extended position and the collapsed position corresponding to the height change.

According to an example of the presently disclosed subject matter, both of the front wheel assembly and the rear wheel assembly are configured to be automatically manipulated towards the extended position as a result of a user pulling the locomotion platform from the barrier top surface. This operation results with disengagement of the respective wheel assembly from the barrier top surface. Upon this disengagement, each respective wheel assembly manipulates towards the extended position by gravity, springs, engines and the like. The manipulation of both respective wheel assemblies by gravity can occur without interference of the position fixing mechanism. Nevertheless, the position fixing mechanism is ready to automatically arrest each one of the front and rear wheel assemblies in one of the intermediate positions or the extended position upon engaging the riding surface.

According to a particular example, the effort required for extending and collapsing the front and rear wheel assemblies in addition to the regular maneuvering of the locomotion platform on the riding surface can be minimal. I.e. extending and collapsing the locomotion platform does not require sustaining its weight, but rather requires pulling and pushing the locomotion platform from and towards the barrier top surface.

The term 'automatically' as used in connection with the presently disclosed subject matter refers to a sequence of two or more operations performed independently one after the other. For example, the automatic collapsing of the front and rear wheel assemblies, as used herein denotes that the front wheel assembly and the rear wheel assembly are configured to automatically manipulate towards their collapsed position upon engaging a barrier top surface, wherein the force required for automatically collapsing the front wheel assembly and the rear wheel assembly can be transformed from a user's pushing force acting in a direction progressing the locomotion platform against said barrier top surface. Likewise, the front wheel assembly and the rear wheel assembly are configured to automatically extend into one of the intermediate positions or the extended position upon application of a user's pulling force on the locomotion platform in a direction away from the barrier top surface. Upon engaging of the front and rear wheel assemblies with the riding surface, the position fixing mechanism automatically arrests the front and rear wheel assemblies at the closest possible intermediate position or the extended position, in accordance with the respective barrier height.

The term 'barrier top surface' as used herein denotes any object elevated from the riding surface (defined below) up to a predetermined height, and is configured with a rear section. When one of the front wheel assembly and the rear wheel assembly of the locomotion platform disengages the barrier top surface, gravity, as well as springs, engines and the like, causes the respective wheel assembly to manipulate towards the extended position. In some examples, the barrier top surface may be a cargo area of any type of vehicle, either with or without a rear door of any type. A particular example for a vehicle suitable for use in conjunction with the locomotion platform of the present disclosure can be typically similar to a station wagon, estate car, SUV/CUV, pickup car/trunk, or a van, i.e. vehicles typically having relatively large cargo area. In other examples the barrier top surface may be a top surface of a ramp, platform, stage, and the like.

The term 'riding surface' as used herein denotes the ground or any other surface on which the locomotion platform is to be deployed, extending up to a predetermined height below and rearwards to the barrier top surface.

As mentioned above, differently from any other known locomotion platform which allows arresting a locomotion platform upon pulling it from a barrier top surface at a single extended position predefined prior to the pulling, the position fixing mechanism of the present disclosure is configured to automatically arrest the front and rear wheel assemblies at one of the intermediate positions and not only at the extended position upon engagement with the riding surface. The position fixing mechanism of the present disclosure is further configured to automatically enable manipulation of the front and rear wheel assemblies towards the collapsed position upon pushing the locomotion platform onto the barrier top surface and engagement with the barrier top surface. According to a particular example, the position fixing mechanism automatically enables manipulation of the respective wheel assembly by being neutralized. The position fixing mechanism, provides the following:

The locomotion platform may be driven on the riding surface in each one of the plurality of intermediate positions the front and rear wheel assemblies being arrested by the position fixing mechanism, while maintaining its balance and the horizontal landing surface substantially parallel to the riding surface; and The height of the locomotion platform (i.e. the height measured from the riding surface to the horizontal landing plane), can be determined by the position at which the position fixing mechanism arrests the front and rear wheel assemblies. Additionally, the height of the locomotion platform can be changed by manipulating the front and rear wheel assemblies between the extended position and the collapsed position, so as to be arrested at another position by the at least one position fixing mechanism.

Any one or more of the following features, designs and configurations can be incorporated in the locomotion platform of the presently disclosed subject matter, independently or in combination thereof:

The at least one position fixing mechanism can be configured to arrest at least one of said front wheel assembly and said rear wheel assembly at any one of the intermediate positions upon manipulation towards the extended position. In a particular example of the subject matter, the height between the horizontal landing plane and the riding surface while the front and rear wheel assemblies are positioned at the extended position is defined as Hmax. Thus, the height between the horizontal landing plane and the riding plane at any one of the intermediate positions is smaller than Hmax.

The at least one position fixing mechanism can be configured to arrest the at least one of said front wheel assembly and said rear wheel assembly upon engagement of the distal end of the respective wheel assembly with a riding surface. The at least one position fixing mechanism can arrests both the front and rear wheel assemblies at substantially the same position so as to maintain the horizontal landing plane substantially parallel to the riding plane.

In a particular example of the disclosed subject matter, the arresting of the front and rear wheel assemblies by the at least one position fixing mechanism can be induced by a transformed force acting in a downward direction (e.g. gravitational force), extending from the front and rear wheel assemblies against said riding surface during manipulation towards the extended position.

The at least one position fixing mechanism can comprise a locking mechanism configurable between a locked state, at which the locking mechanism prevents manipulation of the respective wheel assembly towards the collapsed position, and an unlocked state, at which the locking mechanism enables manipulation of the respective wheel assembly towards the extended position and towards the collapsed position. The unlocked state of the locking mechanism can be considered as a state at which the position fixing mechanism can be fully or at least partially neutralized, enabling minimal interferences to the manipulation of the respective wheel assembly towards the extended position.

At the locked state thereof, the locking mechanism can be further configured to enable manipulation of the respective wheel assembly towards the extended position. According to a particular example, the locking mechanism can comprise an asymmetrical wheel selectively (e.g. ratchet wheel), arrested by a pawl that prevents pivotal movement towards a first direction while enabling pivotal movement in an opposite second direction.

The locking mechanism can comprise a controlling module configured to change the state of the locking mechanism from the locked state to the unlocked state. The controlling module can also connect the at least one position fixing mechanism to the activating module, either mechanically or electrically.

The locking mechanism can comprise a maneuverable member connected to the respective wheel assembly and configured to maneuver respectively upon manipulation of the respective wheel assembly, and an arresting member operable by said controlling module for selectively arresting the maneuverable member. The maneuverable member may be formed by an asymmetrical wheel (i.e. ratchet wheel) and the arresting member can be formed by a pawl. In such cases, the pawl can arrest the asymmetrical wheel from pivoting to a first direction by being inserted between the teeth of the asymmetrical wheel. In other cases, the maneuverable member may be formed by a double-acting cylinder (e.g. dual-mode gas spring cylinder), and the arresting member can be formed by a stopper configured to prevent movement of the piston rod inside the double-acting cylinder.

The arresting member can be manipulable between an arresting position associated with the locked state of the locking mechanism and at which the arresting member arrests the maneuverable member, and a releasing position associated with the unlocked state of the locking mechanism and at which the arresting member allows maneuvering of the maneuverable member.

The manipulation of the at least one of said front wheel assembly and said rear wheel assembly by the at least one activating module can be provided in a direct or an indirect manner. The at least one activating module can be configured to actuate the controlling module to change the state of the locking mechanism from the locked state to the unlocked state. In a particular example of the presently disclosed subject matter, the locking mechanism can be configured to change its state back to locked state when the activating module does not actuate the controlling module. Thus, providing the locked state as the default state of the locking mechanism.

The controlling module can be configured to manipulate the arresting member between the arresting position and the releasing position, so as to change the state of the locking mechanism between the locked state and the unlocked state, respectively. In some cases, the actuation can be made by mechanically actuating the controlling module (e.g. such as pulling a component), which may be embodied as a brake cable, thus disengaging the arresting member away from the maneuverable member. In other cases, the actuation can be made electronically by sending an electrical input from the activating module to the controlling module inducing the disengagement of the arresting member away from the maneuverable member.

The change of the state of the locking mechanism from the locked state to the unlocked state by the at least one activating module can be performed prior to a successive manipulation of at least one of said front wheel assembly and said rear wheel assembly towards the collapsed position. According to a particular example, the change of the state of the locking mechanism from the locked state to the unlocked state by the at least one activating module can be performed only after the respective lowermost section of the base frame is mounted on top of the barrier top surface. Thus, preventing the wheel assembly from collapsing before the barrier top surface can sustain part of the weight of the locomotion platform.

The at least one activating module can be configured to maintain the locking mechanism at the unlocked state during the successive manipulation of the at least one of said front wheel assembly and said rear wheel assembly towards the collapsed position. According to a particular example, the unlocked state can be maintained by continuous engagement of the activation module with the barrier top surface. The continuous engagement can be made physically by contacting the barrier top surface, or electronically, by providing signals from a proximity sensor, which sense the barrier top surface.

The at least one activating module can comprise a manipulating module, configured to manipulate the at least one of said front wheel assembly and said rear wheel assembly towards the collapsed position upon engaging a barrier top surface. In some cases, the operation of the manipulating module also actuates the controlling module to release the arrest induced by the at last one position fixing mechanism.

The activating module can be configurable between: a free state, at which the activating module can be disengaged from the barrier top surface, and the locking mechanism can be at the locked state; an engaged state, at which the activating module engages the barrier top surface and the activating module change the state of the locking mechanism from the locked state to the unlocked state; a manipulating state, at which the activating module engages the barrier top surface, maintains the unlocked state of the locking mechanism and the manipulating module manipulates the respective wheel assembly to be manipulated to a position between the extended position and the collapsed position; and a collapsed state, at which the activating module engages the barrier top surface, maintains the unlocked state of the locking mechanism and the manipulating module can be restricted from further manipulation of the respective wheel assembly to the collapsed position.

The activating module can be configured to automatically and sequentially change the state thereof from said free state, through the engaged state and the manipulating state to the collapsed state upon engaging the barrier top surface. The activating module can also be configured to automatically and sequentially change the state thereof upon deployment from said collapsed state, through the manipulating state and the engaged state to the free state upon disengaging from the barrier top surface. In a particular example, the change in states during the deployment occurs due to gravitational force pulling the respective wheel assemblies into manipulating towards the extended position, which in turn changes the states of the activating module. In another example, the activating module may sense that the respective wheel assembly is disengaged from the top of a barrier top surface and induce the manipulation of the respective wheel assembly towards the extended position The activating module can be automatically configured to sequentially assume said free state upon disengagement of the activating module from the barrier top surface, so as to cause the at least one position fixing mechanism to arrest the respective wheel assembly at any one of the intermediate positions or the extended position upon engaging a riding surface.

The manipulating module can comprise an activating arm pivotally connected to either one of: the base frame or the respective wheel assembly, the activating arm can be positioned in front of the respective wheel assembly, and the activating arm can be configured to pivot towards a pushing member fixedly connected to the respective wheel assembly upon the engagement with the barrier top surface. In a particular example, the engagement of the activating arm with a rear section of the barrier top surface pivots the activating arm towards the respective wheel assembly, whereupon the further the activating arm pivots towards the wheel assembly, the further the respective wheel assembly manipulates towards the collapsed position.

The activating arm can be articulated with an encounter wheel at a free end thereof. In such cases, the activating arm can engage the barrier top surface by rolling thereon, so as to ease the pushing and pulling onto and from the barrier top surface. The encounter wheel, as well as the riding wheels and the landing wheels may comprise an extension adjustment module. The extension adjustment module can be utilized to extend and retract the aforementioned wheels from and to their initial position, so as to enable adjustments to different barriers top surface topologies.

The at least one position fixing mechanism interconnects the base frame and at least one of the front wheel assembly and the rear wheel assembly. The at least one position fixing mechanism can comprise a front position fixing mechanism for arresting the front wheel assembly and a rear position fixing mechanism for arresting the rear wheel assembly, and wherein said front position fixing mechanism and said rear position fixing mechanism are configured to operate independently. In some cases, the front and rear wheel assemblies comprise a pair of right and left wheel assemblies, each comprising a position fixing mechanism. In a particular example, each pair of right and left wheel assemblies of the respective wheel assembly may be connected by at least one interconnecting bar member, so as for cooperation in the manipulation of the similar components of each respective wheel assembly, provide support and provide equivalent weight distribution.

The front position fixing mechanism and said rear position fixing mechanism can be configured to operate in a consecutive manner.

The at least one activating module can comprise a front activating module configured to induce manipulation of the front wheel assembly, and a rear activating module configured to induce manipulation of the rear wheel assembly. In some cases, the front and rear activating modules may comprise a single activating module, located in front of and at the middle of their respective wheel assembly. In other cases, the front and rear activating modules may comprise two or more activating modules, distributed adjacent to the pair of right and left wheel assemblies. In yet another cases, the activating module can be situated on the payload base in front of the front and rear wheel assemblies.

The front activating module mechanism and said rear activating module can be configured to operate in a consecutive manner. In such cases, the locomotion platform collapses in two main steps so that in the first step the front wheel assembly collapses upon introducing the front lowermost section of the base frame onto the barrier top surface upon the front activating mechanism engaging a rear section of the barrier top surface, and in the second step the rear wheel assembly collapses upon introducing the rear lowermost section of the base frame onto the barrier top surface upon the rear activating mechanism engaging a rear section of the barrier top surface.

The front lowermost section can comprise one or more front landing wheels and the rear lowermost section can comprise one or more rear landing wheels equi-leveled with the one or more front landing wheels, and wherein bottom sections of said front landing wheels and said rear landing wheels define said horizontal landing plane.

The locomotion platform further comprising a payload articulated to a top surface of the base frame. The payload can be any assembly, fixedly or detachably articulated to the locomotion platform of the present disclosure. The locomotion platform of the presently disclosed subject matter can be any platform that is configured for locomotion from place to place on a riding surface, and for example can be a tool cart, a shopping cart, a hand cart, a stretcher, a movable seat, and the like. A payload can also be a load mounted directly or indirectly over the locomotion platform (e.g. different cargo, bags, articles, etc.). In some cases, the front and rear lowermost sections of the base frame are situated on the payload and the front and rear landing wheels are articulated to the payload, respectively, serving for locomotion the payload module over the barrier top surface.

The position fixing mechanism can further comprise at least one safety mechanism operable with the at least one position fixing mechanism for selectively arresting any one of the front wheel assembly and the rear wheel assembly at any one of the intermediate positions. The safety mechanism can be operable manually or electronically by a user.

The safety mechanism can comprise at least one breaking member configurable between a braking state, at which the at least one breaking member arrests the position of the respective wheel assembly in one of the one or more intermediate positions, and a non-breaking state, at which the at least one breaking member enables the respective wheel assembly to manipulate to one of the one or more intermediate positions, and a break actuator coupled to the at least one breaking member, configurable to selectively change the state of the at least one breaking member between the braking state and the non-breaking state upon actuation thereof. The position arresting provided by the at least one breaking member can be similar to the position arresting provided by the arresting member of the locking mechanism.

The locomotion platform can further comprise at least one position manipulation mechanism configured to selectively manipulate at least one of said front wheel assembly and said rear wheel assembly to any position between the collapsed position and the extended position. The position manipulation mechanism can be configured to manipulate the front wheel assembly and the rear wheel assembly without engagement of the activating module with a barrier top surface. For example, the position manipulation mechanism can manipulate the front and rear wheel assemblies towards the collapsed or extended position positions to adjust the height of the locomotion platform for diverse operational needs. Also, the position manipulation mechanism can manipulate only one of the front and the rear wheel assemblies towards the collapsed or extended positions to level the front and rear wheel assemblies. The at least one position manipulation mechanism can be further configured to manipulate both of the front and rear wheel assemblies while the locomotion platform comprises a payload. This dynamic manipulation enables a user to elevate and lower the locomotion platform, alongside possible payload placed thereon, by changing the positions of the front and rear wheel assemblies using the position manipulation mechanism.

The position manipulation mechanism can comprise a manipulation controller, and a first clutch configurable between a connected state, at which the position manipulation mechanism can be connected to the manipulation controller so as to enable the position manipulation mechanism to manipulate the respective wheel assembly upon actuation of the manipulation controller, and a disconnected state, at which the position manipulation mechanism is disconnected from the manipulation controller so as to prevent the position manipulation mechanism from manipulating the respective wheel assembly upon actuation of the manipulation controller. The manipulation controller can comprise a crank for enabling a user to manipulate the at least one wheel assembly by rotating the crank. In another example, the manipulation controller can comprise an engine connected to the front and rear wheel assemblies for enabling a user to manipulate the at least one wheel assembly by operating the engine. The manipulation controller can further comprise a transmission module connecting the manipulation controller to the at least one wheel assembly so as to ease the manipulation of the at least one wheel assembly by the user.

The manipulation controller can further comprise a releasing switch configured to change the state of the locking mechanism to the unlocked state prior to the actuation thereof. The releasing switch can be configured to change the state of the locking mechanism to the unlocked state prior to the actuation only upon manipulation of the front and rear wheel assemblies toward the collapsed position. In a particular example, the manipulation controller is operably connected to the activating module and is configured to induce activation of the controlling module by the activating module.

The position manipulation mechanism can comprise a wheel assembly connector, configured to selectively connect the front wheel assembly and the rear wheel assembly, whereupon manipulation of either one of the front wheel assembly and the rear wheel assembly by the position manipulation mechanism induces respective manipulation of the other wheel assembly.

The position manipulation mechanism can further comprise a second clutch configurable between a connected state, at which the wheel assembly connector pivotally connects the front wheel assembly and the rear wheel assembly so as to manipulate both of the respective wheel assemblies upon actuation of the manipulation controller, and a disconnected state, at which the wheel assembly connector can be pivotally connected to only one of the front wheel assembly and the rear wheel assembly so as to manipulate only one of the front wheel assembly and the rear wheel assembly upon actuation of the manipulation controller.

The position manipulation mechanism can comprise an activating switch, configured to change the states of the first clutch and the second clutch simultaneously.

According to a second example of the locomotion platform, the front and rear position fixing mechanism, can be formed as a two-way cylinder configured to apply resistance upon manipulating the front and rear wheel assembly between the collapsed position and the extended position.

According to a third example of the locomotion platform, the front and rear position fixing mechanism can be formed from the position fixing mechanism of the first example and the second example together.

According to another example of the locomotion platform, the front and rear wheel assemblies may be integrated with the front and rear position fixing mechanisms, respectively.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
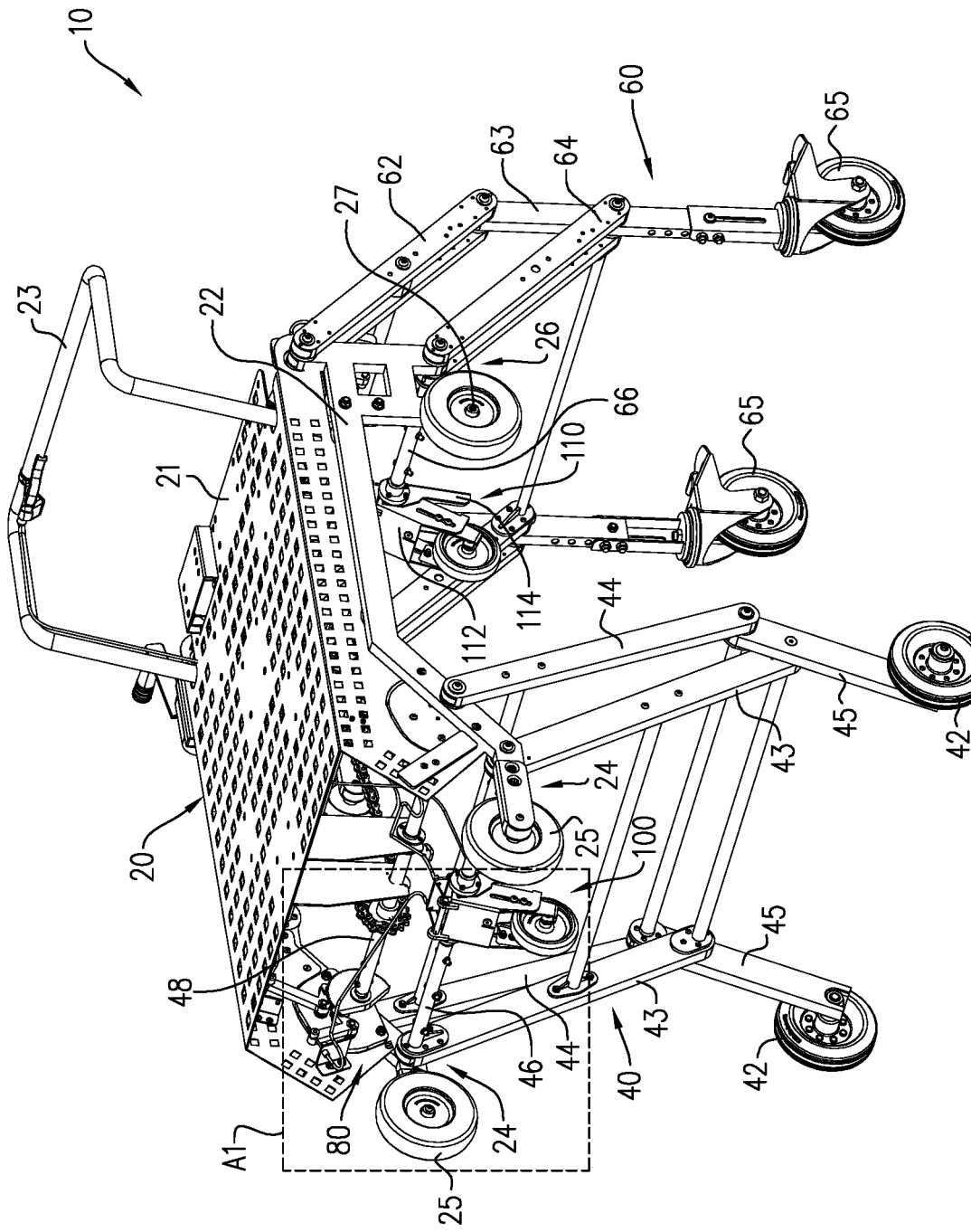
FIG. 1A is a top front perspective view of a locomotion platform with front and rear wheel assemblies at their extended position, according to a first example of the presently disclosed subject matter.

Attention is directed to FIGS. 1 to 7 of the drawings illustrating a first example of a locomotion platform, according to the presently disclosed subject matter. The locomotion platform, generally designated 10, is formed as a flat wheeled cart. In other examples, the locomotion platform 10 may differ in shape and size for enabling a plurality of usages.

In general, the locomotion platform 10 is collapsible and extendable by manipulation of a front wheel assembly 40 and a rear wheel assembly 60 thereof between their collapsed and extended positions in an automated or a semi-automated manner. The locomotion platform 10 can be automatically mounted on a barrier top surface 15 from a riding surface 12 and be safely deployed from the barrier top surface 15 to another riding surface 13 (as seen in FIGS. 5A-C) having a different barrier height measured from the barrier top surface 15.

The locomotion platform 10 comprises a base frame 20 configured for bearing a payload on a payload base 21 thereof between a bilateral frame wall 22. The base frame 20 has a front lowermost section 24 including two front landing wheels 25 and a rear lowermost section 26 including two rear landing wheels 27. Bottom sections of the front landing wheels 25 and the rear landing wheels 27 define an imaginary horizontal landing plane 28 extending therebetween (shown in FIG. 1B). According to other examples, not illustrated, the front lowermost section 24 can include only one front landing wheel, and the rear lowermost section 26 can include only one rear landing wheel.

Figure 1B:
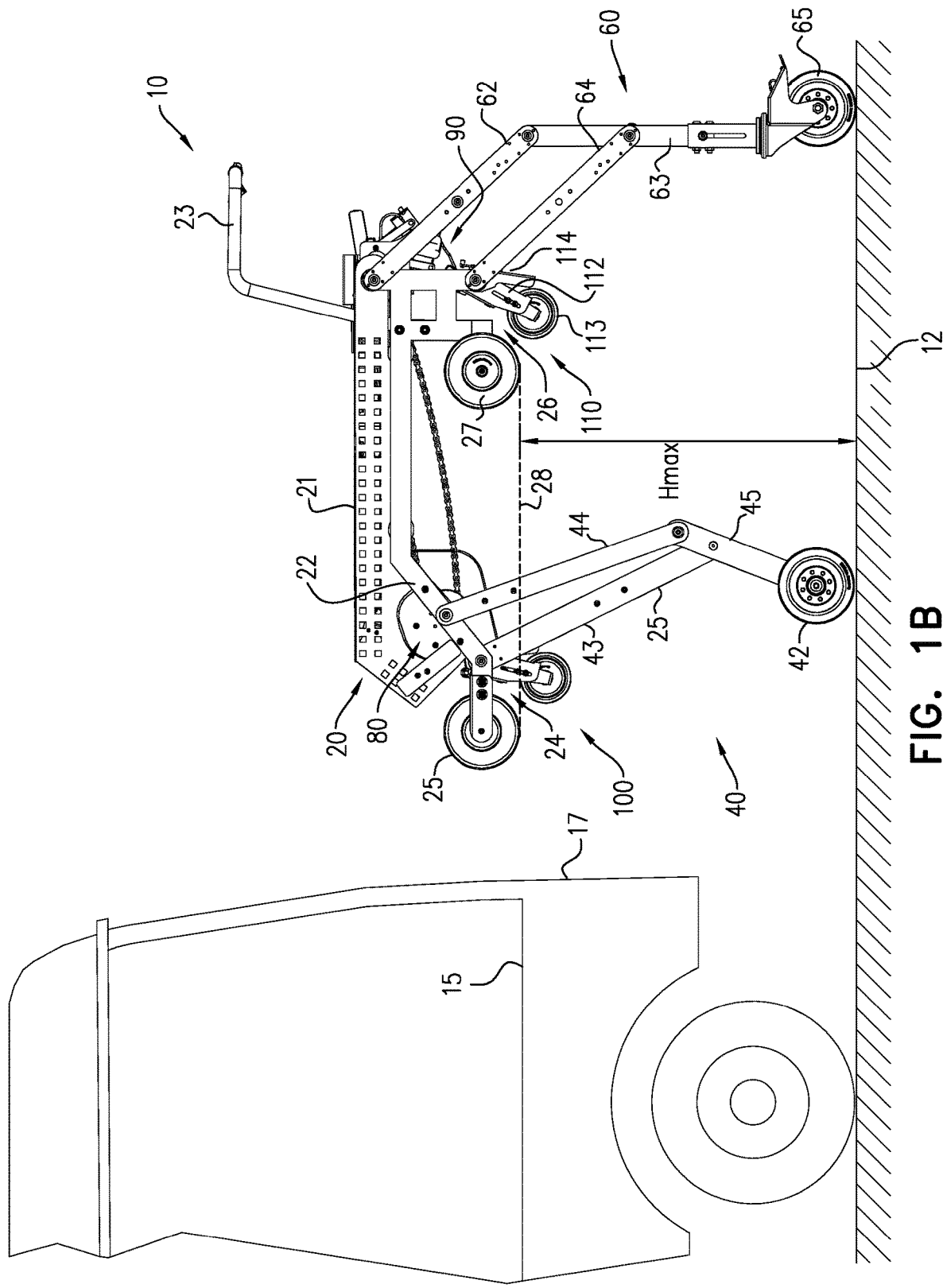
FIG. 1B is a side view of the locomotion platform of FIG. 1A, illustrating the locomotion platform approaching the rear section of a schematically displayed vehicle.
Figure 1C:
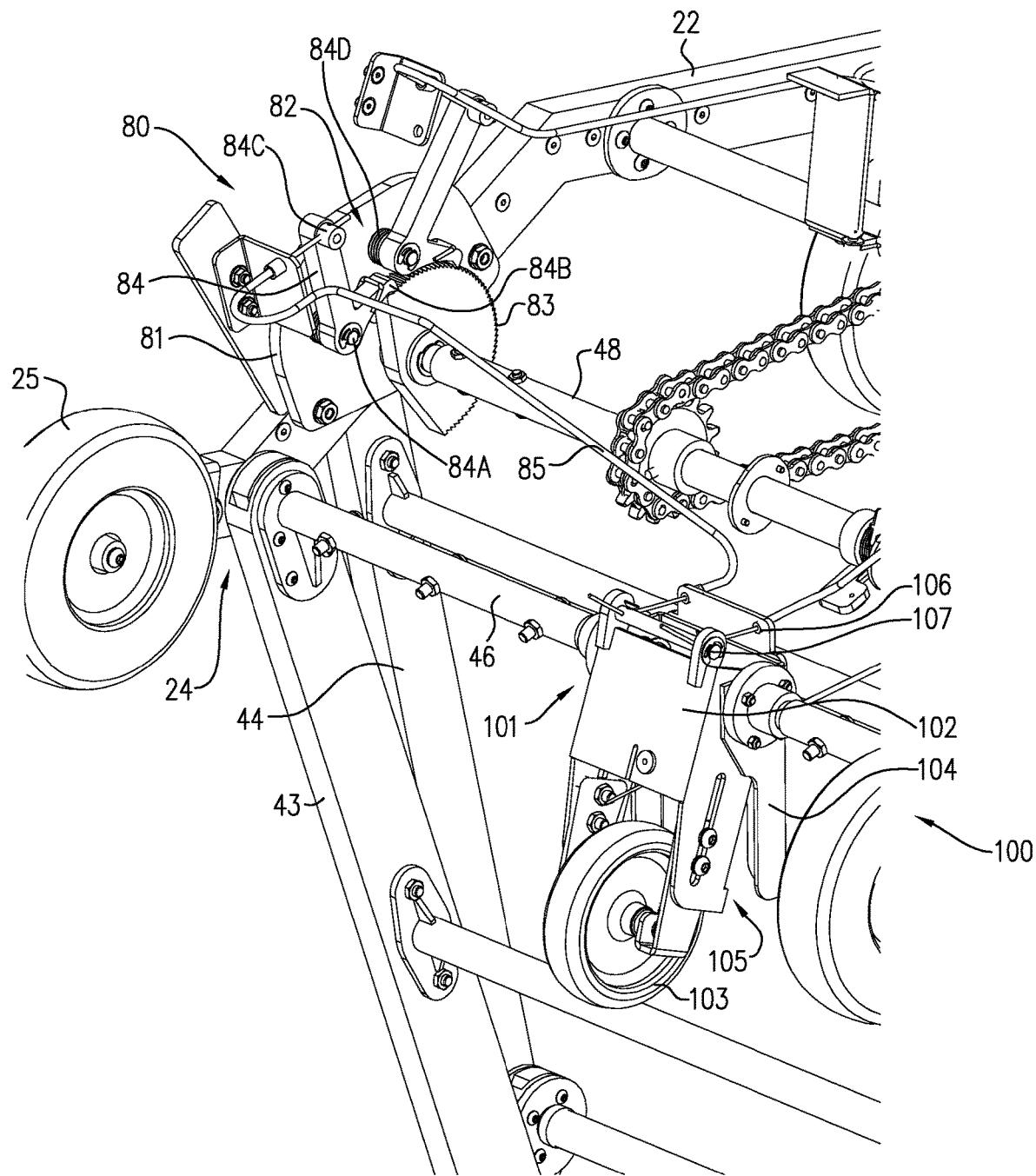
FIG. 1C is an enlarged view of section A1 of FIG. 1A, with a section of a base frame thereof removed for illustration purposes.
Figure 4A:
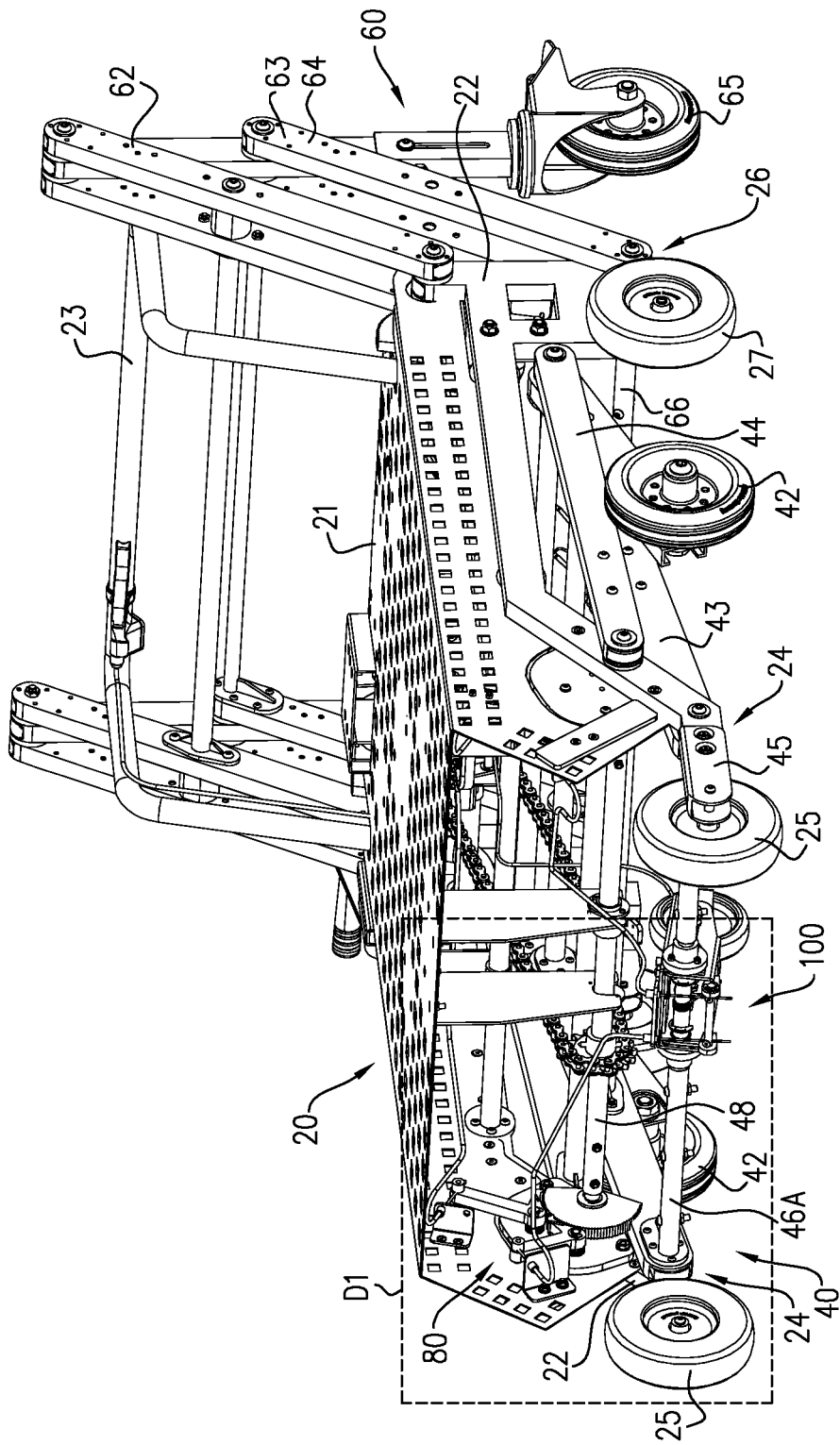
FIG. 4A is a top front perspective view of a locomotion platform of FIG. 1A, with front and rear wheel assemblies at their collapsed position.
Figure 4B:
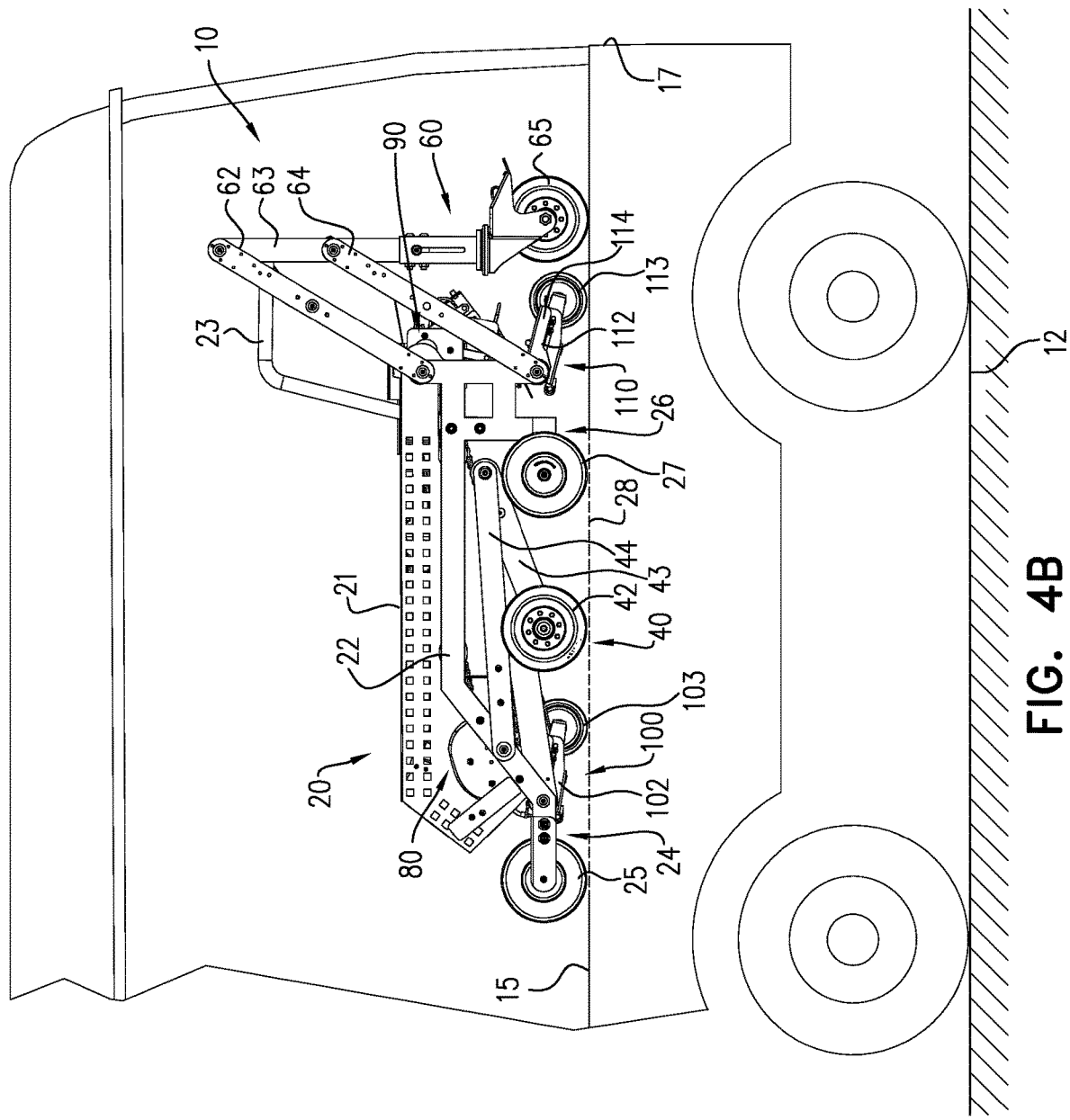
FIG. 4B is a side view of the locomotion platform of FIG. 4A, illustrating the locomotion platform is mounted on a schematically displayed vehicle.
Figure 4C:
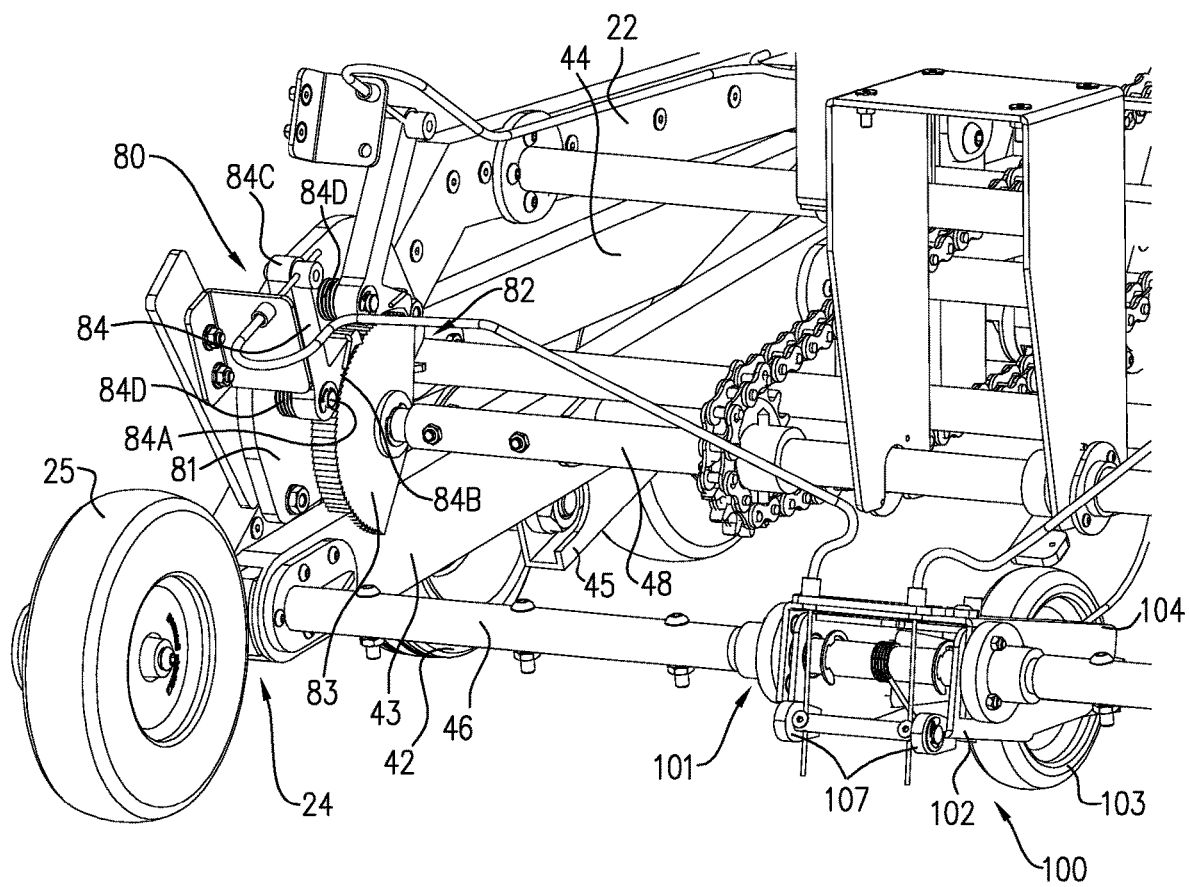
FIG. 4C is an enlarged view of section D1 of FIG. 4A, with a section of a base frame thereof removed for illustration purposes.

The front wheel assembly 40 and the rear wheel assembly 60 are pivotally connected to the base frame 20. Both of the front wheel assembly 40 and the rear wheel assembly 60 are independently manipulable between an extended position (as shown in FIGS. 1A-C) and a collapsed position (as shown in FIGS. 4A-C). The front landing wheels 25 and the rear landing wheels 27 are equi-leveled.

Figure 5:
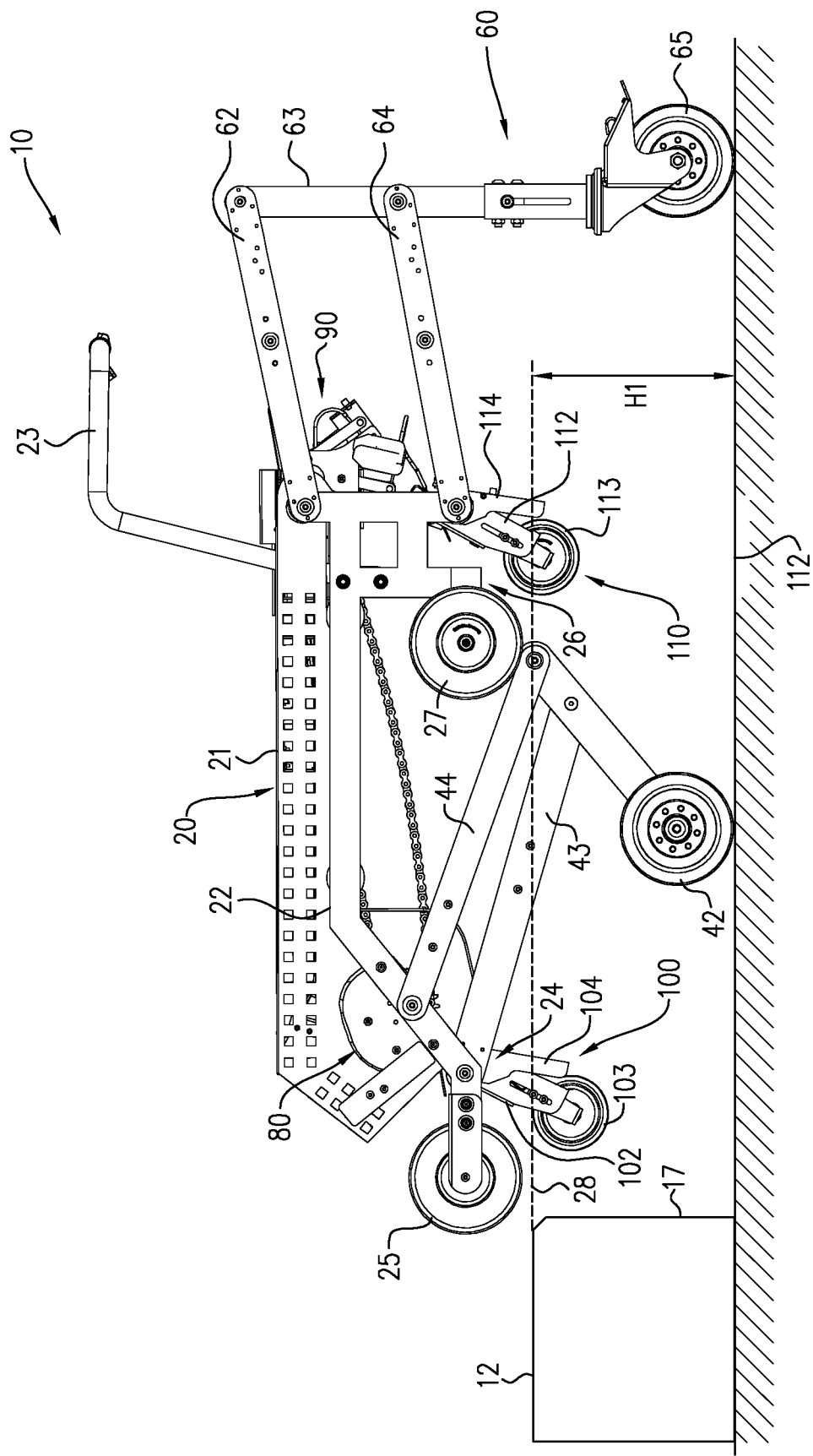
FIG. 5 is a side view of the locomotion platform of FIG. 1A, with front and rear wheel assemblies at an intermediate position.

The locomotion platform 10 further comprises a front position fixing mechanism 80 and a rear position fixing mechanism 90. The front position fixing mechanism 80 is configured to selectively arrest the front wheel assembly 40 and the rear position fixing mechanism 90 is configured to selectively arrest the rear wheel assembly 60. Both the front and rear position fixing mechanisms 80 and 90 are configured to arrest their respective wheel assembly at one of one or more intermediate positions between the collapsed position and the extended position (including the collapsed and the extended positions). One of the intermediate positions is shown in FIG. 5, discussed below in a detailed manner Both the front and rear position fixing mechanisms 80 and 90 are configured to arrest their respective wheel assembly upon engagement with the riding surface 12. According to other examples, not illustrated, the locomotion platform 10 can include only one position fixing mechanism, configured to selectively arrest both the front wheel assembly and the rear wheel assembly.

The locomotion platform 10 further comprises a front activating module 100 and a rear activating module 110. Both front and rear activating modules 100 and 110 are configured to induce manipulation of their respective wheel assembly towards the collapsed position. Both of the front and rear activating modules 100 and 110 are configured to induce manipulation of their respective wheel assembly automatically upon engagement with the barrier top surface 15 on which the locomotion platform 10 is configured to be mounted. The barrier top surface 15 schematically represents any surface elevated from the ground such as a stage, a ramp, a platform, a trunk of a vehicle, etc. According to other examples, not illustrated, the locomotion platform 10 can include only one activating module, configured to induce the manipulation of both the front wheel assembly and said rear wheel assembly.

The structure of the base frame 20 and the front and rear wheel assemblies 40 and 60 connected thereto are designed such that the horizontal landing plane 28 is maintained substantially parallel to the ground upon mounting and deploying from the barrier top surface 15.

As illustrated, the front wheel assembly 40 and the rear wheel assembly 60 are bilateral, each of which comprising similar components at both lateral sides of the locomotion platform 10. The similar components of the front wheel assembly 40 and of the rear wheel assembly 60 are interconnected by a parallely disposed interconnecting members for cooperation in the manipulation of the similar components of each respective wheel assembly (as further disclosed below). As best seen in FIG. 1A, the front wheel assembly 40 comprises a distal end having two front riding wheels 42 and a proximal end pivotally articulated to the bilateral frame wall 22. Also, each lateral side of the rear wheel assembly 60 comprises a distal end having two rear riding wheels 65 and a proximal end pivotally articulated to the bilateral frame wall 22.

The collapsed position (shown in FIGS. 4A-4C) for each respective wheel assembly is determined as the position at which the riding wheels of the respective wheel assembly are disposed above the horizontal landing plane 28. Additionally, the extended position (shown in FIGS. 1A-1C) for each respective wheel assembly is determined as the position at which the riding wheels of the respective wheel assembly are disposed below the horizontal landing plane 28. The extended position is determined as the position with a maximal height between the horizontal landing plane 28 and the front and rear riding wheels 42 and 65, defined as 'Hmax' (shown in FIG. 1B). In order for the locomotion platform 10 to be mounted on or deployed from the barrier top surface 15, the barrier height between the barrier top surface 15 and the front and rear riding wheels 42 and 65, should be lower than 'Hmax'.

As shown, the front wheel assembly 40 is formed such that the horizontal vector of the two front riding wheels upon manipulation of the front wheel assembly is minimal, while maintaining the center of gravity of the locomotion platform substantially same. The front wheel assembly 40 comprises a front link 43 pivotally articulated at a top end thereof to the bilateral frame wall 22. The front link 43 is also pivotally coupled at its bottom end to a front riding wheel link 45 fitted at the bottom end thereof with the one or more front riding wheels 42. The front wheel assembly 40 further comprise a rear link 44, having a top end pivotally articulated to the bilateral frame wall 22 above the articulating point of the front link 43. The rear link 44 further comprises a bottom end pivotally articulated to the front riding wheel link 45 above the pivoting point of the front link 43.

The front wheel assembly 40 further comprises a plurality of interconnecting members, such as axes and bars, which connects the pair of like components of the front wheel assembly 40 on both lateral sides of the base frame 20. In such cases, the front wheel assembly 40 comprises a front top end axis 46, connecting both of the top and bottom ends, respectively, of the front link 43 on either side of the locomotion platform 10. The front wheel assembly 40 also comprises a rear top end axis 48, articulately connecting both of the top and bottom ends, respectively, of the rear link 44 on either side of the locomotion platform 10. The proximal end of the front wheel assembly 40 is defined as the top end of the front link 43 and the front top end axis 46.

The rear wheel assembly 60 is formed as a parallel link mechanism, comprising a top arm link 62 pivotally articulated at one end thereof to the bilateral frame wall 22. The top arm link 62 is also pivotally coupled at its opposed end to a rear riding wheel link 63 fitted at its bottom end with the one or more rear riding wheels 65. The rear wheel assembly 60 further comprises a bottom arm link 64 pivotally connected at a first end thereof to the bilateral frame wall 22 below the pivoting point of the top arm link 62. The bottom arm link 64 is also pivotally articulated at a second end thereof to the rear riding wheel link 63 below the pivoting point of the top arm link 62. At this configuration, the top arm link 62 and the bottom arm link 64 remains parallely disposed with respect to each other upon manipulation of the rear wheel assembly 60.

The rear wheel assembly 60 comprises a plurality of interconnecting members, such as axes and bars that connects the pair of like components on both lateral sides of the base frame 20. In such cases, the rear wheel assembly 60 comprises a top arm upper axis 68, articulately connecting both of the top and bottom ends, respectively, of the top arm link 62 on either side of the locomotion platform 10. The rear wheel assembly 60 also comprises a bottom arm high axis 66, articulately connecting both of the top and bottom ends, respectively, of the bottom arm link 64 on either side of the locomotion platform 10. The proximal end of the rear wheel assembly 60 is defined as the top end of the top arm link 62 and the top arm upper axis 68.

The front and rear wheel assemblies 40 and 60 are configured to enable the locomotion platform 10 to ride on the riding surface 12, while positioned in any one of the one or more intermediate positions and the extended position. The locomotion platform 10 can be locomoted by using a handle bar 23, disposed from a back section of the payload base 21. Also, the front and rear wheel assemblies 40 and 60 are configured to keep the locomotion platform 10 balanced, and the horizontal landing surface substantially parallel to the riding surface 12.

When mounted on top of the barrier top surface 15, the collapsed locomotion platform 10 can be transported from place to place (e.g. when the barrier top surface 15 is a part of a vehicle being driven from a first place to a second place). As a result of this transportation, as well as other causes such as wheels pressure change, heavy load etc., the barrier height can be changed to a second barrier height, which is either greater or smaller than the first barrier height. Thus, safe deployment from the barrier top surface 15 occurs when the locomotion platform 10 is deployed from the barrier top surface 15, the front and rear wheel assemblies 40 and 60 are respectively manipulated towards the extended position. As a result of this manipulation, each of the front and rear wheel assemblies 40 and 60 is arrested in one of the intermediate positions or the extended position, upon engaging the riding surface 12. The arrested position is corresponding to a height between the horizontal landing plane 28 and the riding surface 12, the value of which is between 0 and Hmax (inclusive).

The mounting of the locomotion platform 10 on the barrier top surface 15 comprises two steps derived by as single continues push of the locomotion platform towards the barrier top surface 15. At the first step, shown in FIG. 3B, the front wheel assembly 40 is manipulated into the collapsed state while the front landing wheels 25 of the locomotion platform engages the barrier top surface 15, and the rear wheel assembly 60 is on the riding surface. At the second step, shown in FIG. 4B, the front wheel assembly 40 is collapsed and mounted on top of the barrier top surface 15 and the rear wheel assembly 60 manipulates towards the collapsed position.

The deployment of the locomotion platform 10 from the barrier top surface 15 comprises two steps derived by as single continues pull of the locomotion platform from the barrier top surface 15. At the first step, at which the front wheel assembly 40 is collapsed and mounted on the barrier top surface 15 and the rear wheel assembly 60 is manipulated towards extended position (by gravitational force, engines, springs and the like). Then, the rear wheel assembly 60 is being arrested at one of the one or more intermediate positions upon engaging the riding surface 12. At the second step, the front wheel assembly is manipulated into the extended position (by gravitational force, engines, springs and the like) while the rear section of the locomotion platform 10 is extended in either one of the one or more intermediate positions or the extended position on the riding surface 12. Then, the front wheel assembly 40 is being arrested at about the same position as the rear wheel assembly 60.

Manipulation of the front wheel assembly 40 and the rear wheel assembly 60 farther from the extended position or farther from the collapsed position are restricted by the base frame 20. The effort required for mounting and deploying the locomotion platform 10 to and from the barrier top surface 15 in addition to the regular maneuvering of the locomotion platform on the riding surface 12 is minimal. As such, manipulating the locomotion platform 10 between the extended position and the collapsed position does not require sustaining the weight of the locomotion platform 10, but rather requires pulling and pushing the locomotion platform 10.

The force required for collapsing the front wheel assembly 40 and the rear wheel assembly 60 is transformed from a user's pushing force acting in a direction progressing the locomotion platform 10 against the barrier top surface 15. Likewise, the front wheel assembly 40 and the rear wheel assembly 60 are configured to extend into one of the intermediate positions or the extended position upon application of a user's pulling force on the mounted locomotion platform 10 in a direction away from the barrier top surface 15. Upon engagement of the front and rear wheel assemblies 40 and 60 with the riding surface 12, the front and rear wheel assemblies 40 and 60 are automatically arrested by the at least one position fixing mechanism at the closest possible position towards the collapsed position.

Explanations are now made with respect to the operation of the front position fixing mechanism 80 and the rear position fixing mechanism 90 in conjunction with their respective wheel assembly. The front position fixing mechanism 80 and the rear position fixing mechanism 90 are configured to arrest their respective wheel assembly independently of one another. In the present example, the front and rear position fixing mechanisms 80 and 90 pivotally interconnect the base frame 20 and their respective wheel assembly. The front and rear position fixing mechanism 80 and 90 are bilateral and comprise similar components at both lateral sides of the locomotion platform 10.

The height of the locomotion platform 10 (i.e. the height from the horizontal landing plane 28 to the distal end of the wheel assemblies), can be determined by the position the front and rear position fixing mechanisms 80 and 90 arrest the front and rear wheel assemblies 40 and 60. Additionally, the height of the locomotion platform 10 can be changed by changing the position of the front and rear wheel assemblies 40 and 60 are arrested between the extended position and the collapsed position. The front and rear position fixing mechanisms 80 and 90 are configured to arrest the position of the front and rear wheel assemblies 40 and 60 upon engagement of their respective riding wheels with the riding surface 12. The front and rear position fixing mechanisms 80 and 90 arrests both of the front and rear wheel assemblies 40 and 60 at substantially the same position so as to maintain the horizontal landing plane 28 substantially parallel to the riding surface 12.

Each one of the front and rear position fixing mechanisms 80 and 90 comprise a front and rear intermediate plate 81 and 91 fixedly connected to the base frame 20 and a front and rear locking mechanism 82 and 92 connected to the inner side of the front and rear intermediate plate 81 and 91. The front and rear intermediate plate 81 and 91 are configured to maintain their position on the base frame 20 during the manipulation of the front and rear wheel assemblies 40 and 60. The front and rear locking mechanism 82 and 92 are configurable between a locked state, at which the front and rear locking mechanism 82 and 92 prevents manipulation of their respective wheel assembly towards the collapsed position, and an unlocked state, at which the front and rear locking mechanism 82 and 92 enables free manipulation of their respective wheel assembly towards either one of the extended position and the collapsed position. The unlocked state of the front and rear locking mechanism 82 and 92 can also be considered as the state at which the front and rear position fixing mechanisms 80 and 90 can be fully or at least partially neutralized, i.e. not engaged with the respective wheel assembly. Thus, enabling minimal disturbances to the manipulation of the front and rear wheel assemblies 40 and 60.

The front and rear locking mechanisms 82 and 92 comprises a front and a rear maneuverable members 83 and 93, a front and a rear arresting members 84 and 94 and a front and a rear controlling module 85 and 95, respectively. Each one of the front and rear maneuverable members 83 and 93 is connected to its respective wheel assembly and configured to maneuver respectively upon manipulation of the respective wheel assembly. The front maneuverable member 83 is fixedly connected to the rear top end axis 48 and the rear maneuverable member 93 is fixedly connected to the top arm upper axis 68. As best illustrated in FIG. 1C, the maneuverable member may be formed as a gear, which is circumferenced by uniformly disposed asymmetrical teeth having a steep slope at one end and a moderate slope at the other end thereof (i.e. ratchets wheel). The front and rear maneuverable members 83 and 93 can also be formed as a section of a ratchets wheel having an angle substantially similar to the angle difference of the front wheel assembly between the collapsed position and the front position.

The front and rear arresting members 84 and 94 of the front and rear locking mechanisms 82 and 92 are manipulable with respect to their respective maneuverable members between an arresting position and a releasing position. At the arresting position, associated with the locked state of the front and rear locking mechanisms 82 and 92, the front and rear arresting members 84 and 94 arrest the maneuverable members 83 and 93. At the releasing position, associated with the unlocked state of the front and rear arresting members 84 and 94, the front and rear arresting members 84 and 94 allow maneuvering of the respective maneuverable member.

Each of the front and rear arresting members 84 and 94 is formed by a pawl. The front and rear arresting members 84 and 94 can be pivotally connected to the base frame 20 by arresting axes 84A and 94A, respectively. Each one of the front and rear arresting members 84 and 94 further comprises an engaging section 84B and 94B designed to be inserted between the teeth of their respective maneuverable member so as to engage the maneuverable members. Each one of the front and rear arresting members 84 and 94 further comprises an arresting member spring 84D and 94D designed to apply compression force on the arresting member 84 so as to maintain the engagement of the arresting member with the maneuverable member.

For example (which disclosed the front locking mechanism 82 but also refers to the rear locking mechanism 92), upon insertion of the front arresting member 84 to a depression between the teeth of the front maneuverable member 83, the front arresting member 84 can arrest the front maneuverable member 83 from pivoting to a first direction and enable pivoting to a second direction. Specifically, upon pivoting the maneuverable member 83 to a first direction, the front arresting member 84 is configured to slide up and over the moderate slopes of the teeth, with a spring 84D forcing the front arresting member 84 into the next depression between the teeth as it passes the tip of each tooth. When the front maneuverable member 83 pivots towards the second direction, the front arresting member 84 will be positioned against the steep sloped edge of the first tooth it encounters, thereby arresting the tooth and preventing any further motion of the front maneuverable member 83, and the respective wheel assembly in that direction.

The front and the rear controlling module 85 and 95 of the front and rear locking mechanism 82 and 92 are configured to change the state of their respective locking mechanism from the locked state to the unlocked state. The front and the rear controlling modules 85 and 95 are configured to selectively change the state of the front and rear locking mechanism 82 and 92 by manipulating their respective arresting members. The front and rear controlling module 85 and 95 may also manipulate the manipulated ends 84C and 94C of the front and rear arresting member 84 and 94, causing the front and rear arresting member 84 and 94 to pivot around their arresting axes 84A and 94A to disengage from the front and rear maneuverable member 83 and 93.

For example (which disclosed the front locking mechanism 82 but also refers to the rear locking mechanism 92), manipulation of the front arresting member 84 away from the front maneuverable member 83 results with the front arresting member 84 disengaging from the depressions of the front maneuverable member 83, thus allowing the front maneuverable member 83 to pivot towards the first direction and towards second direction. Also, by opposite manipulation, the front controlling module 85 allows the front arresting member 84 to pivot back around the front arresting axis 84A by the arresting member spring 84D towards the front maneuverable member 83. By doing so, the front engaging section 84B of the front arresting member 84 is inserted into a depression of the front maneuverable member 83, thus preventing the front maneuverable member 83 to pivot towards the second direction. As shown, the front and rear controlling module 85 and 95 connects the front and rear position fixing mechanism 80 and 90 to the front and rear activating module 100 and 110.

Each one of the front and rear activating modules 100 and 110 is formed by a single activating module, located in front, and at the middle of the front wheel assembly 40 and the rear wheel assembly 60. According to other examples, not illustrated, the front and rear activating modules 100 and 110 can formed from a pair of similar components at both lateral sides of the front wheel assembly 40 and the rear wheel assembly 60.

The actuation of the front and rear controlling module 85 and 95 is made physically by pulling the front and rear controlling module 85 and 95, which are embodied as brake cables connecting the front and rear locking mechanism 82 and 92 to the front and rear activating module 100 and 110, respectively. According to other examples, not illustrated, the actuation can be made electronically by sending an electrical input signal from the front and rear activating module 100 and 110 to the front and rear controlling module 85 and 95 inducing the disengagement of the front and rear arresting member 84 and 94 from the front and rear maneuverable member 83 and 93.

The front and rear activating module 100 and 110 are also configured to maintain the front and rear locking mechanism 82 and 92 at the unlocked state. For example, the front and rear activating module 100 and 110 can maintain the front and rear locking mechanism 82 and 92 at the unlocked state during the manipulation of their respective wheel assembly towards the collapsed position. The unlocked state of the front and rear locking mechanism 82 and 92 is configured to be maintained by continuous engagement of the front and rear activation module 100 and 110 with the barrier top surface 15.

Each of the front and rear activation module 100 and 110 further comprises a front and a rear manipulating module 101 and 111, respectively. The front and rear manipulating modules 101 and 111 are configured to manipulate the front and rear wheel assemblies 40 and 60, respectively, towards the collapsed position upon engagement of the front and rear manipulating module 101 and 111 with a rear section 17 of the barrier top surface 15. The front and rear manipulating module 101 and 111 are also configured to actuate the front and rear controlling modules 85 and 95, respectively, so as to release the arrest induced by their respective position fixing mechanism. Also, the front and rear manipulating modules 101 and 111 are configured to change of the state of the front and rear locking mechanisms 82 and 92 from the locked state to the unlocked state prior to manipulating their respective wheel assembly.

Figure 2A:
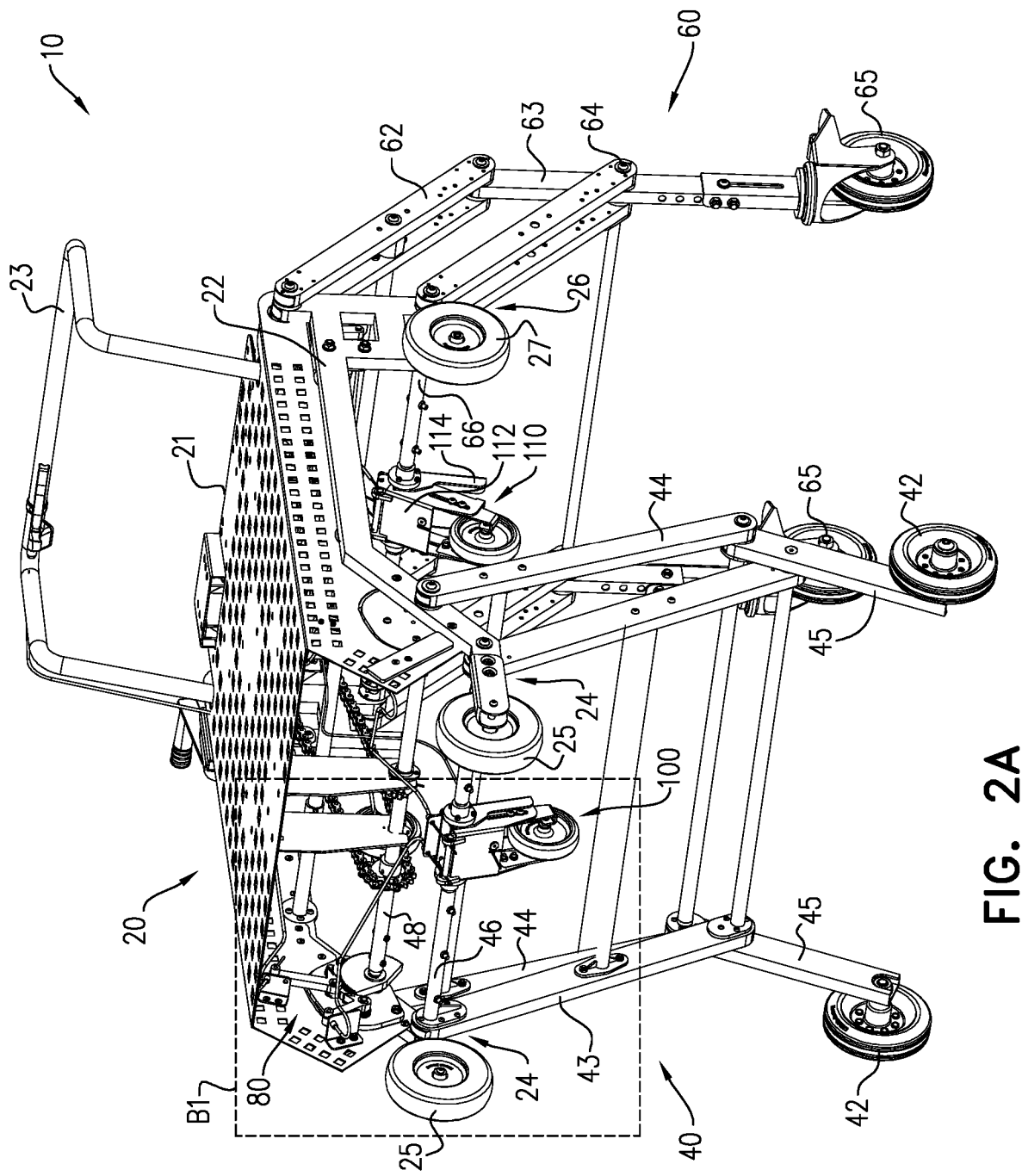
FIG. 2A is a top front perspective view of the locomotion platform of FIG. 1A, with its activating module at an engaging state.
Figure 2B:
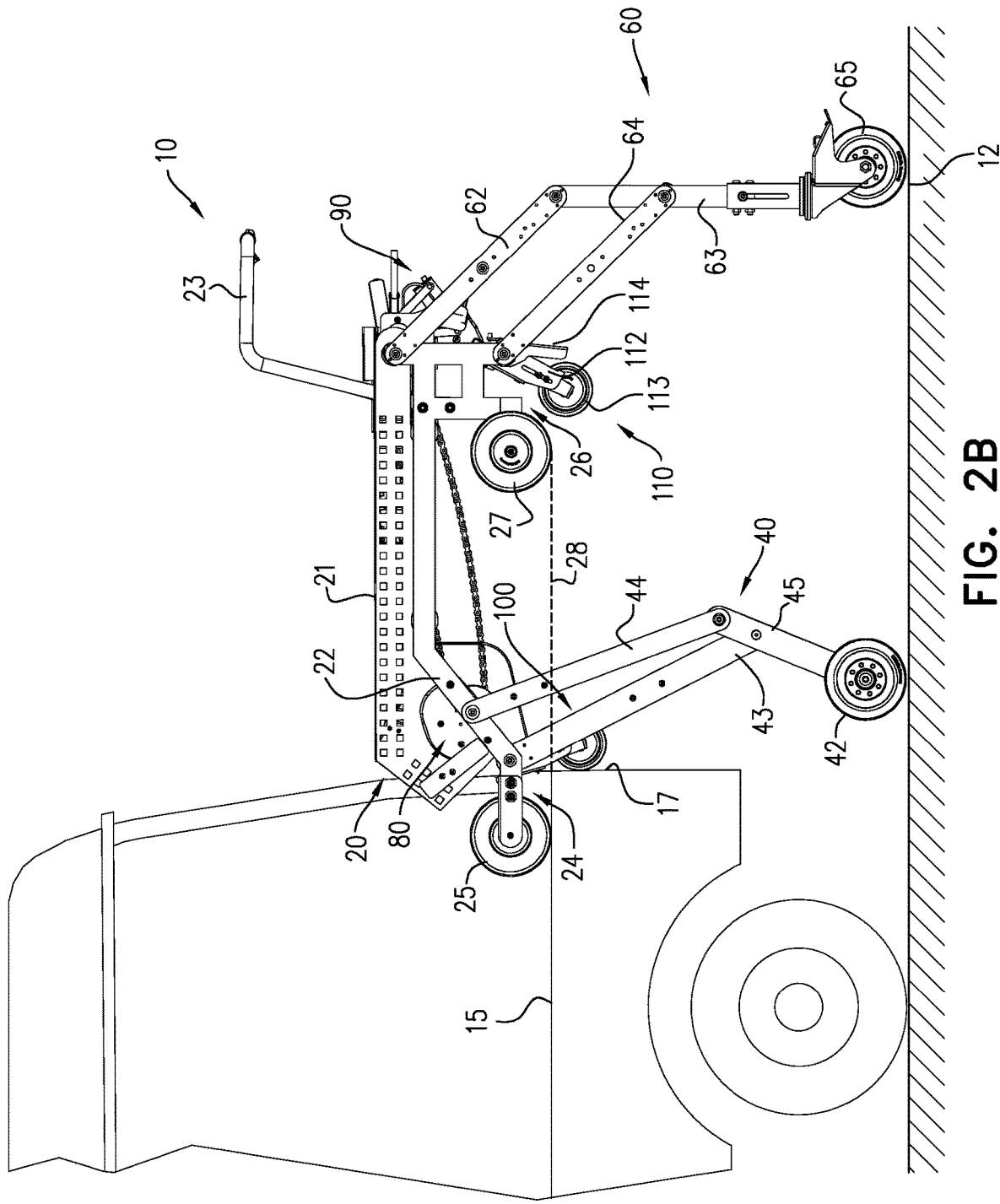
FIG. 2B is a side view of the locomotion platform of FIG. 2A, illustrating the locomotion platform engaging a rear section of a schematically displayed vehicle.
Figure 2C:
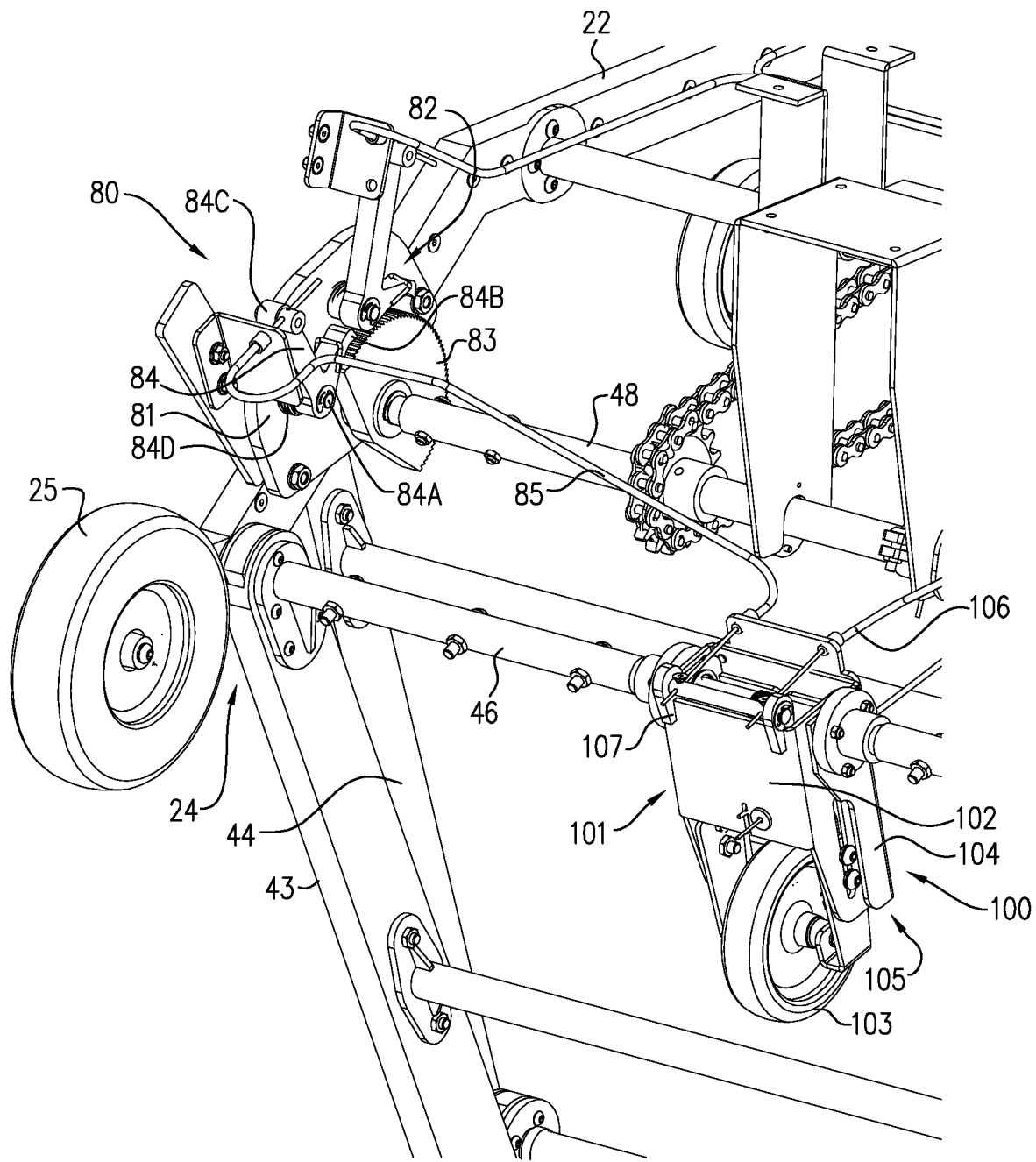
FIG. 2C is an enlarged view of section B1 of FIG. 2A, with a section of a base frame thereof removed for illustration purposes.

Each one of the front and rear activating modules 100 and 110 is configured to manipulate between a plurality of states in the same manner and under the same conditions. The following example discloses the front activating module 100, but also applies for the rear activating module 110:

The first state of the front activating module 100 is a free state, as best illustrated in FIGS. 1A to 1C. At the free state, the front activating module 100 is disengaged from the barrier top surface 15, and the front locking mechanism 82 is at the locked state. The second state of the front activating module 100 is an engaged state, as best illustrated in FIGS. 2A to 2C. At the engaged state, the front activating module 100 engages the rear section 17 of the barrier top surface 15 and the front activating module 100 change the state of the front locking mechanism 82 from the locked state to the unlocked state. The front activating module 100 may engage the rear section 17 of the barrier top surface 15 physically, such as by the front manipulating module 101, or electrically, by a proximity sensor (not shown). Upon engagement of the front activating module 100 to the rear section 17 of the barrier top surface 15, the front activating module 100 actuates the front controlling module 85 to change the state of the front locking mechanism 82.

Figure 3A:
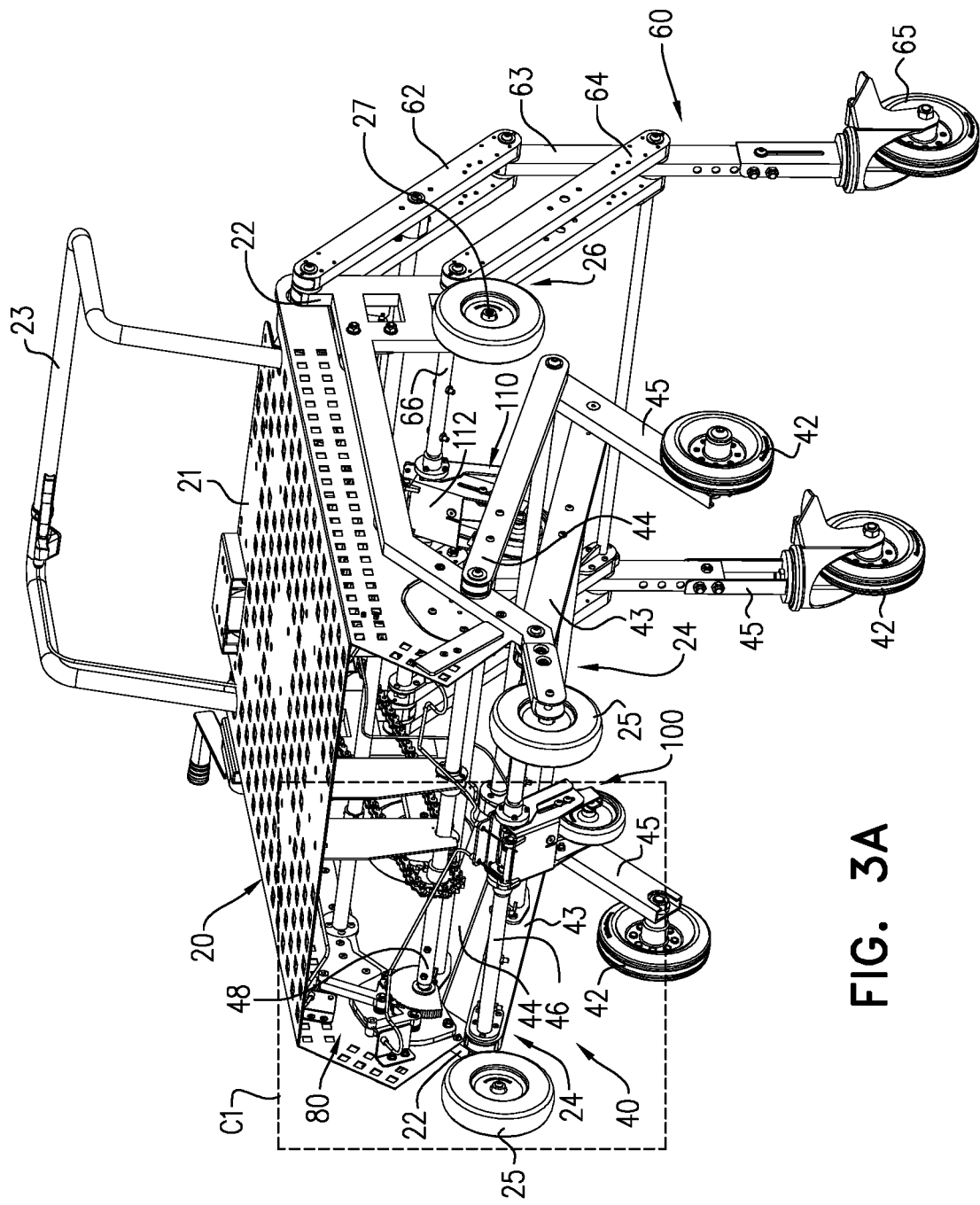
FIG. 3A is a top front perspective view of the locomotion platform of FIG. 1A, with an activating module at a pushing state.
Figure 3B:
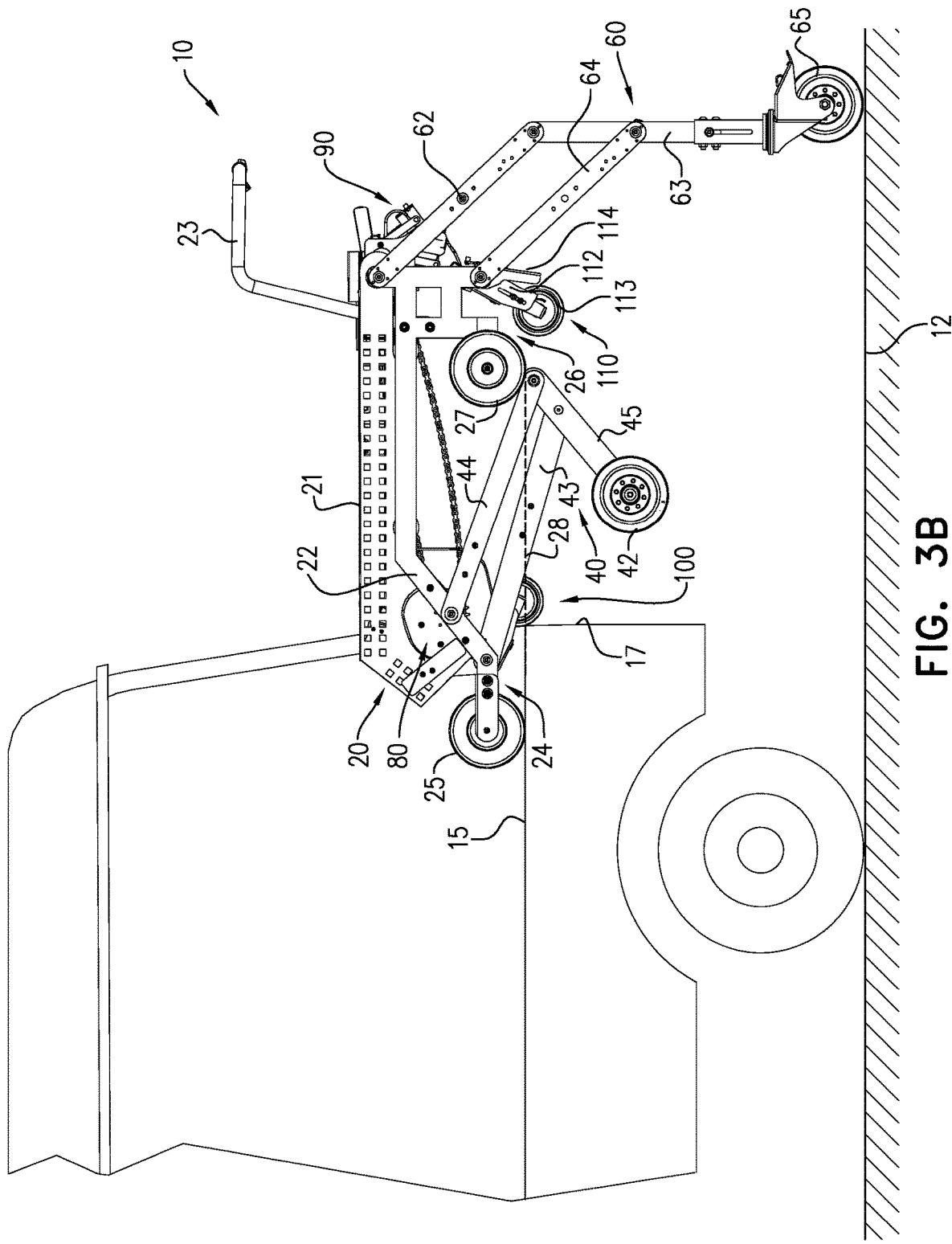
FIG. 3B is a side view of the locomotion platform of FIG. 3A, illustrating the locomotion platform mounting a schematically displayed vehicle.
Figure 3C:
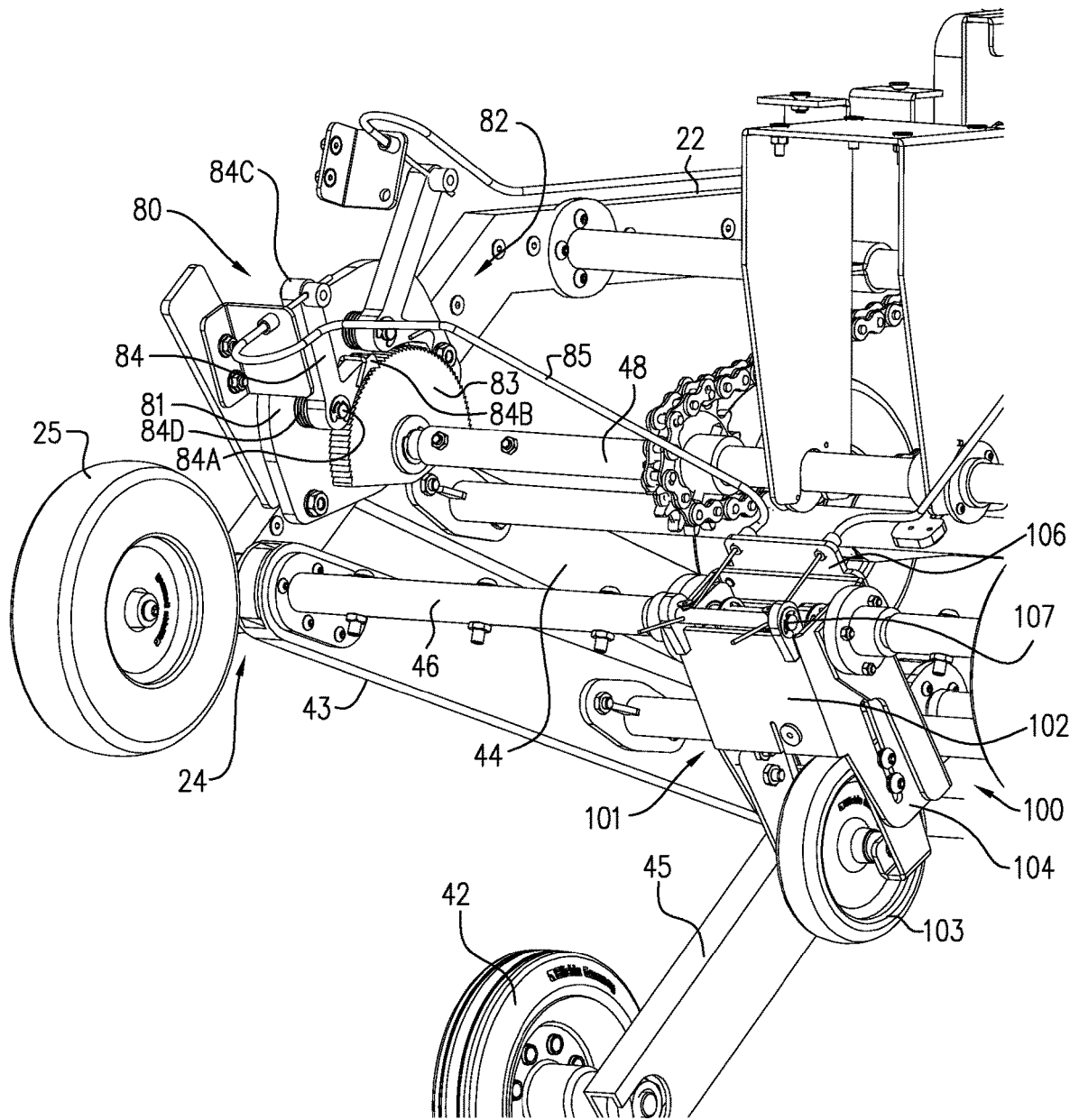
FIG. 3C is an enlarged view of section C1 of FIG. 3A, with a section of a base frame thereof removed for illustration purposes.

The third state of the front activating module 100 is a manipulating state, as best illustrated in FIGS. 3A to 3C. At the manipulating state, the front activating module 100 further engages the barrier top surface 15 relatively to the engaged state. In that state the front activating module 100 maintains the actuation of the front controlling module 85 and the front manipulating module 101 manipulates the front wheel assembly 40 to a different position towards the collapsed position. The manipulation of the front wheel assembly 40 may occur physically, by pivoting of the front manipulating module 101 against a respective section of the front wheel assembly 40, thus pushing the front wheel assembly 40 towards the collapsed position. In other examples, not illustrated, the manipulation of the front wheel assembly 40 may occur electrically, by activating a lifting motor, connected to the front wheel assembly 40. The fourth state of the front activating module 100 is a collapsed state, as best illustrated in FIGS. 4A to 4C. At the collapsed state, the front activating module 100 is fully engaged with the barrier top surface 15 and the front wheel assembly 40 is at a collapsed position. In that state the front activating module 100 still maintains the unlocked state of the front locking mechanism 82 and the front manipulating module 101 is restricted from further manipulating the front wheel assembly 40 towards the collapsed position.

Each one of the front and rear manipulating modules 101 and 111 comprise an activating arm 102 and 112, respectively, pivotally connected to the front and rear wheel assemblies 40 and 60. The front activating arm 102 can be connected to the interconnecting members of the front wheel assembly 40, such as the front top end axis 46 and the rear activating arm 112 can be connected to the interconnecting members of the rear wheel assembly 60, such as the top arm upper axis 68. The front and rear activating arm 102 and 112 are positioned along their respective interconnecting members, and at the center thereof in front of their respective wheel assembly. Both of the front and rear activating arm 102 and 112 are connected at the top ends thereof to their respective interconnecting members, and articulated with a front and rear encounter wheel 103 and 113, respectively, at the free end thereof. Due to the encounter wheels, the front and rear activating arm 102 and 112 can engage the barrier top surface 15 by rolling thereon, so as to ease the pushing and pulling onto and from the barrier top surface 15 and further, to avoid harm that may be caused by dragging the activating arm 102 and 112 on the barrier top surface 15.

The front activating module 100 further comprises a front pushing member 104 fixedly connected to the front wheel assembly 40 at the same place that the front activating arm 102 is connected. Accordingly, the rear activating module 110 further comprises a rear pushing member 114 fixedly connected to the rear wheel assembly 60 at the same place that the rear activating arm 112 is connected. The front and rear pushing members 104 and 114 are configured to be positioned behind the front and rear activating arms 102 and 112, respectively. Each one of the front and rear pushing members 104 and 114 comprises a bottom depression 105 and 115, which is configured to fit the front and rear encounter wheel 103 and 113 of their respective activating arm, respectively, when the front and rear activating arms 102 and 112 are pressed against them.

The front and rear activating arms 102 and 112 are configured to pivot towards and against the front and rear pushing members 104 and 114 upon engagement with the barrier top surface 15. In such example, the engagement of the front and rear activating arm 102 and 112 with the rear section 17 of the barrier top surface 15, pivots the front and rear activating arm 102 and 112 towards their respective wheel assembly, whereupon the further the front and rear activating arms 102 and 112 pivot towards their respective wheel assembly the further the respective wheel assembly manipulates towards the collapsed position.

The following example discloses the front activating module 100, but also applies for the rear activating module 110. FIG. 1C discloses the front wheel assembly 40, a front position fixing mechanism 80, and a front activating module 100 in a free state. As shown, the front activating arm 102 is disengaged from the barrier top surface 15. Thus, the front activating arm 102 is situated such that the front activating arm 102 is not pressed against the front pushing member 104 connected to the front top end axis 46 of the front wheel assembly 40. The front arresting member 84 is at the arresting position, at which the front arresting member 84 is inside the depression disposed between the teeth of the front arresting member maneuverable member 83. The front controlling module 85 is formed as a break cable, extending from the manipulating end 84C of the front arresting member 84, through a front cable aperture 106 disposed through the top section of the front pushing member 104, and to a front break control lever 107 connected at the top end the front activating arm 102.

FIG. 2C discloses the front wheel assembly 40, the front position fixing mechanism 80, and a front activating module 100 in an engaged state. As shown, the front activating arm 102 had engaged the rear section 17 of the barrier top surface 15 and is further pivoted towards the front pushing member 104 so as to pivots the front break control lever 107 respectively and bringing the front encounter wheel 103 to the bottom depression 105 disposed at the bottom section of the front pushing member 104. The pivoting of the front break control lever 107 pulls the manipulated end 84C via the front controlling module 85, causing the front arresting member 84 to pivot thereby disengaging the engaging section 84B from the front maneuverable member 83. Thus, changing the state of the front locking mechanism from the locked state to the unlocked state. The distance between the front break control lever 107 and the front cable aperture 106 remains substantially the same as long as the front activating arm 102 is kept pivoted against the front pushing member 104.

FIG. 3C discloses the front wheel assembly 40, the front position fixing mechanism 80, and a front activating module 100 in the manipulating state. As shown, the front activating arm 102 is further manipulated with respect to its position at the engaged state together with the front pushing member 104 by the barrier top surface 15. By pressing the articulately connected front activating arm 102 against the fixedly connected front pushing member 104, the front activating arm 102 respectively pivots the front top end axis 46 around its axis. As a result, the front wheel assembly 40, which is fixedly connected to the front top end axis 46, manipulates respectively towards the collapsed position via the intermediate positions.

FIG. 4C discloses the front wheel assembly 40, the front position fixing mechanism 80, and the front activating module 100 in the collapsed state. As shown, the front activating arm 102 is further manipulated with respect to its position at the manipulating state together with the front pushing member 104 by the barrier top surface 15. At the collapsed state, the front activating arm 102 is prevented from further manipulation towards the collapsed state. As shown, the distal end of the front activating mechanism 100 is on the horizontal landing plane 28, which indicates that the front wheel assembly 40 is at the collapsed position. In such position, the locomotion platform 10 is able to ride on the barrier top surface 15 by the landing wheels thereof.

Upon deploying the locomotion platform 10 from the barrier top surface 15, the respective activating arm changes states from the collapsed state to the free state respectively to the disengagement from the barrier top surface 15. The disengagement from the barrier top surface 15 causes the respective activating arm of both the front and rear wheel assemblies 40 and 60 to be pulled downwards by gravitational force, engines, springs and the like. Thus, pivoting towards the front side of the locomotion platform 10 and allowing the respective pushing member to also pivot towards the front side of the locomotion platform 10. Upon manipulation of the respective pushing member, the respective wheel assembly manipulates respectively towards the extended position. During the manipulation, the respective arresting member slides up and over the moderate slopes towards the next depression of the respective maneuverable member being constantly pushed towards the next depression by the respective arresting member spring. Upon engaging the riding surface 12, the respective arresting member remains in the depression of the respective maneuverable member and prevents the respective maneuverable member from pivoting to the other side, thus preventing the manipulation of the respective wheel assembly towards the collapsed position. In such cases, the respective wheel assembly is arrested at one of the intermediate positions at a height H1 from the riding surface 12, as illustrated in FIG. 5, where the height H1 is the distance between the horizontal landing plane 28 and the riding surface 12 at that intermediate position.

Figure 6:
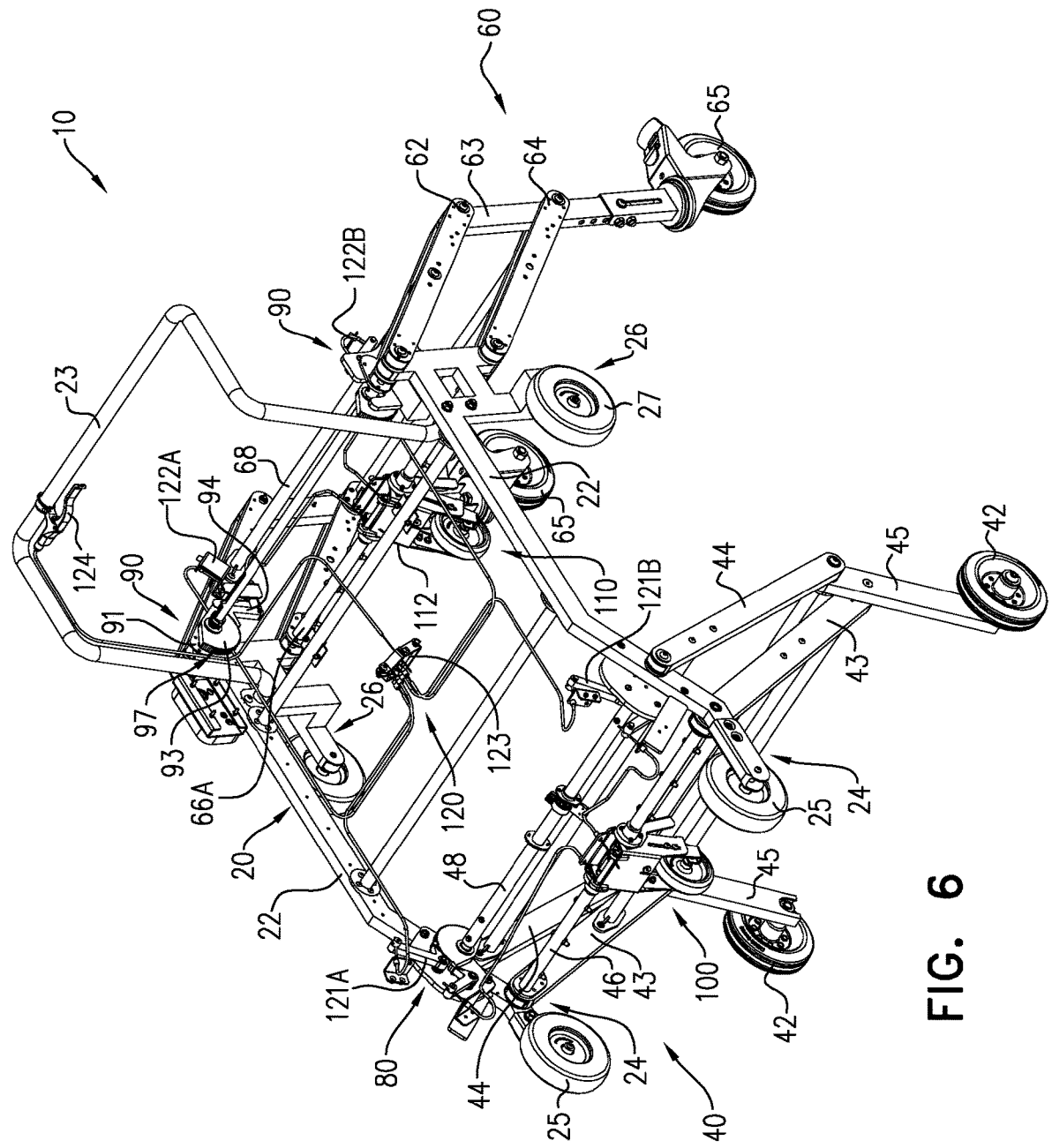
FIG. 6 is a top front perspective view of the locomotion platform of FIG. 1A, with a section of a base frame thereof removed for illustration purposes.

The front and rear position fixing mechanism 80 and 90 further comprises a safety mechanism 120 (best illustrated in FIG. 6). The safety mechanism 120 of the at front and rear position fixing mechanism 80 and 90 is configured to provide a second arresting mechanism in addition to the front and rear locking mechanism 82 and 92 while operating on riding surface (i.e. not mounting/deploying). In a particular example, the safety mechanism 120 is similar to the position fixing mechanism, and operates in parallel to the locking mechanism thereof. The safety mechanism 120 is configured to selectively induce arrest by the front and rear position fixing mechanism 80 and 90 to the front and rear wheel assembly 40 and 60 at any position thereof. The arrest induced by the safety mechanism 120 is configured to prevent manipulation of the front and rear wheel assemblies 40 and 60 towards the collapsed position.

As shown, the safety mechanism 120 comprises front breaking members 121A and 121B and rear breaking members 122A and 122B configurable between a braking state and a non-breaking state. at the braking state the breaking members (121A, 121B, 122A and 122B) arrests the position of their respective wheel assembly in one of the one or more intermediate positions so as to prevent manipulation of the respective wheel assembly towards the collapsed position. At the non-breaking state, the breaking members (121A, 121B, 122A and 122B) are disengaged from their respective wheel assemblies so as to enable manipulation thereof to both directions. The safety mechanism further comprises a break actuator 123 coupled to the breaking members (121A, 121B, 122A and 122B), and configurable to selectively change the state of the breaking members (121A, 121B, 122A and 122B), simultaneously, between the braking state and the non-breaking state upon actuation thereof by a user. The break actuator 123 is actuated by a break lever 124 connected to the break actuator 123 and located on the handle bar 23 of the locomotion platform for a user's comfort. Upon actuation of the break lever 124 by a user, the break actuator 123 is actuated by the break lever 124 and changes the state of the breaking members (121A, 121B, 122A and 122B) to a non-braking state. When the actuation of the break lever 124 is ceased (such as by releasing the break lever 124), the breaking members (121A, 121B, 122A and 122B) returns to their braking state automatically. According to other examples, not illustrated, the breaking members (121A, 121B, 122A and 122B) can be formed in a different manner, such as electronical engines, configured to be operated electronically by the break actuator 123.

Figure 7A:
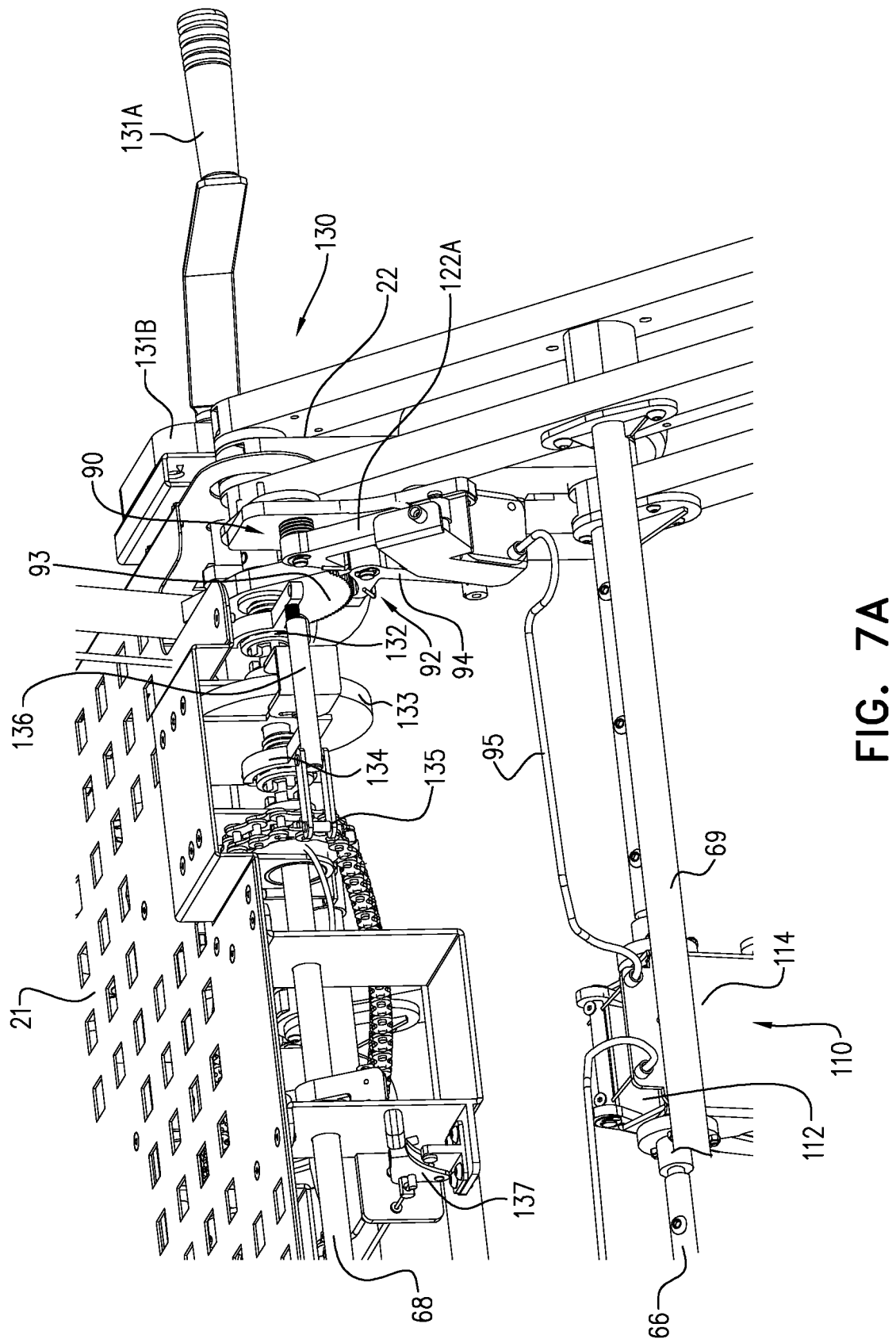
FIG. 7A is a top rear perspective view of the locomotion platform of FIG. 1A, with a position manipulation mechanism in its non-connected state.
Figure 7B:
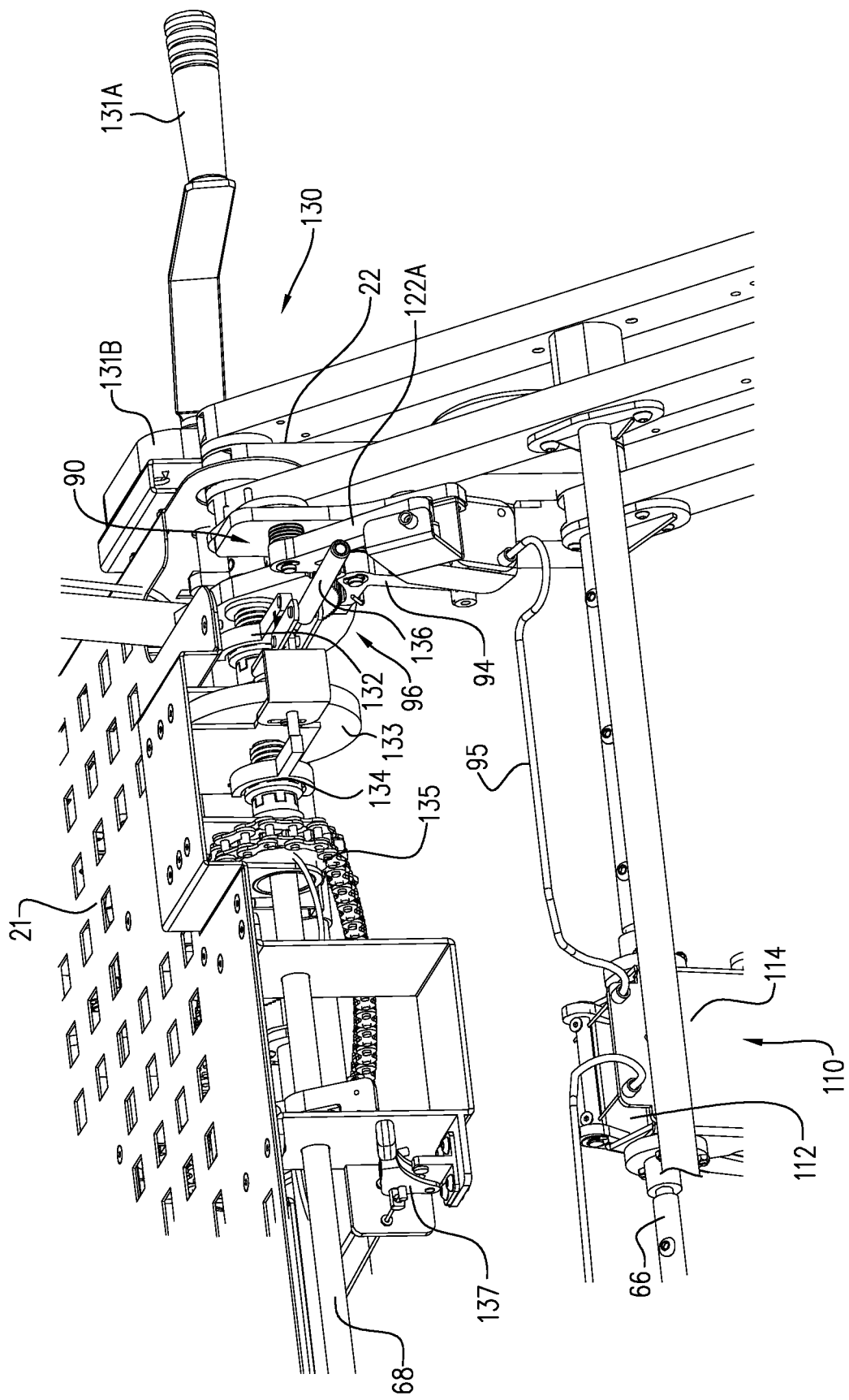
FIG. 7B illustrates the locomotion platform of FIG. 7A, with the position manipulation mechanism in its connected state.

As best illustrated in FIGS. 7A and 7B, the locomotion platform 10 further comprises a position manipulation mechanism 130 configured to selectively manipulate both of the front wheel assembly 40 and the rear wheel assembly 60, together, to any position between the collapsed position and the extended position. The position manipulation mechanism 130 comprises: a manipulation controller 131 and a first clutch 132. The manipulation controller 131 is configured to be operated by a user, so as to manually change the arresting position of the front and rear wheel assemblies 40 and 60 simultaneously. The manipulation controller 131 comprises a crank 131A selectively connected to the top arm upper axis 68 enabling a user to manipulate the at least rear wheel assembly 60 by rotating the crank 131A, which is disconnected from the rear wheel assembly 60 by default. The manipulation controller 131 further comprises a transmission module 131B connecting the crank 131A to the rear wheel assembly 60, so as to ease the manipulation of the rear wheel assembly 60 by the user. The manipulation controller 131 is configured to change the state of the front and rear locking mechanisms 82 and 92 to the unlocked state prior to the actuation thereof, as further elaborated below. The manipulation mechanism 130 can further comprise a releasing switch 137, configured to change the state of the front and rear locking mechanisms 82 and 92 to the unlocked state when actuated. In a particular example, the releasing switch 137 is operably connected to the front and rear activating module 100 and 110 and is configured to induce activation of the front and rear controlling module 85 and 95 by the activating modules 100 and 110. Upon actuation of the releasing switch 137, the releasing switch 137 pulls the front and rear activating arms 102 and 112, so as to change the state of the front and rear locking mechanisms 82 and 92 to the unlocked state.

The position manipulation mechanism 130 is configurable between a connected state, at which the manipulation controller 131 is connected to the rear wheel assembly 60 so as to enable the position manipulation mechanism 130 to manipulate the rear wheel assembly 60 upon actuation of the manipulation controller 131, and a disconnected state, at which the position manipulation mechanism 130 is disconnected from the rear wheel assembly 60 so as to prevent the position manipulation mechanism 130 from manipulating the rear wheel assembly 60 upon actuation of the manipulation controller 131.

The first clutch 132 is fixedly connected to the top arm upper axis 68 although enabled to be laterally maneuvered by an activating switch 136. At the connected state, the position manipulation mechanism 130 connects the first clutch 132 to a first transmission member 133, configured to transmit power from the manipulation controller 131 to manipulate the first clutch 132, and thus pivot the top arm upper axis 68 and manipulate the rear wheel assembly 60 upon actuation of the manipulation controller 131. At the non-connected state, the position manipulation mechanism 130 is disconnected from the first clutch 132, and thus manipulation of either one of the rear wheel assembly 60 and the manipulation controller 131 does not manipulate the other, so as to prevent the position manipulation mechanism 130 from manipulating the rear wheel assembly 60 upon actuation of the position manipulation mechanism 130.

The position manipulation mechanism 130 further comprises a second clutch 134 configurable between a connected state, at which the second clutch 134 is connected to a second transmission member 135 which connects the front wheel assembly 40 and the rear wheel assembly 60, and a disconnected state, at which the second clutch 134 is disconnected from the second transmission member 135. The second clutch 134 is also configured to be fixedly connected to the top arm upper axis 68 alongside the first clutch 132, and also being enabled to be laterally maneuvered by an activating switch 136 respectfully to the first clutch 132, such that at a connected state manipulation of the manipulation controller 131 by a user causes the second clutch 132 to pivot respectively so as to pivot the second transmission member 135. Pivoting of the second transmission member 135 causes the front wheel assembly 40 to pivot respectively via pivoting the rear top end bar 48, which also connects the similar component of the front position fixing mechanism 80. Thus, the second clutch 134 is configured to manipulate the front wheel assembly 40 upon manipulation of the rear wheel assembly 60. The second transmission member 135 as shown is formed by a bicycle chain system having a front and rear bicycle gears connected by a bicycle chain or the like.

The activating switch 136 is configured to change the state of the position manipulation mechanism 130 between the connected state and the non-connected state by maneuvering both the first clutch 132 and the second clutch 134 laterally along the top arm upper axis 68. In the present example, the activating switch is required when the position manipulation mechanism is used to manipulate the front and rear wheel assemblies 40 and 60 towards the collapsed position.

Figure 8A:
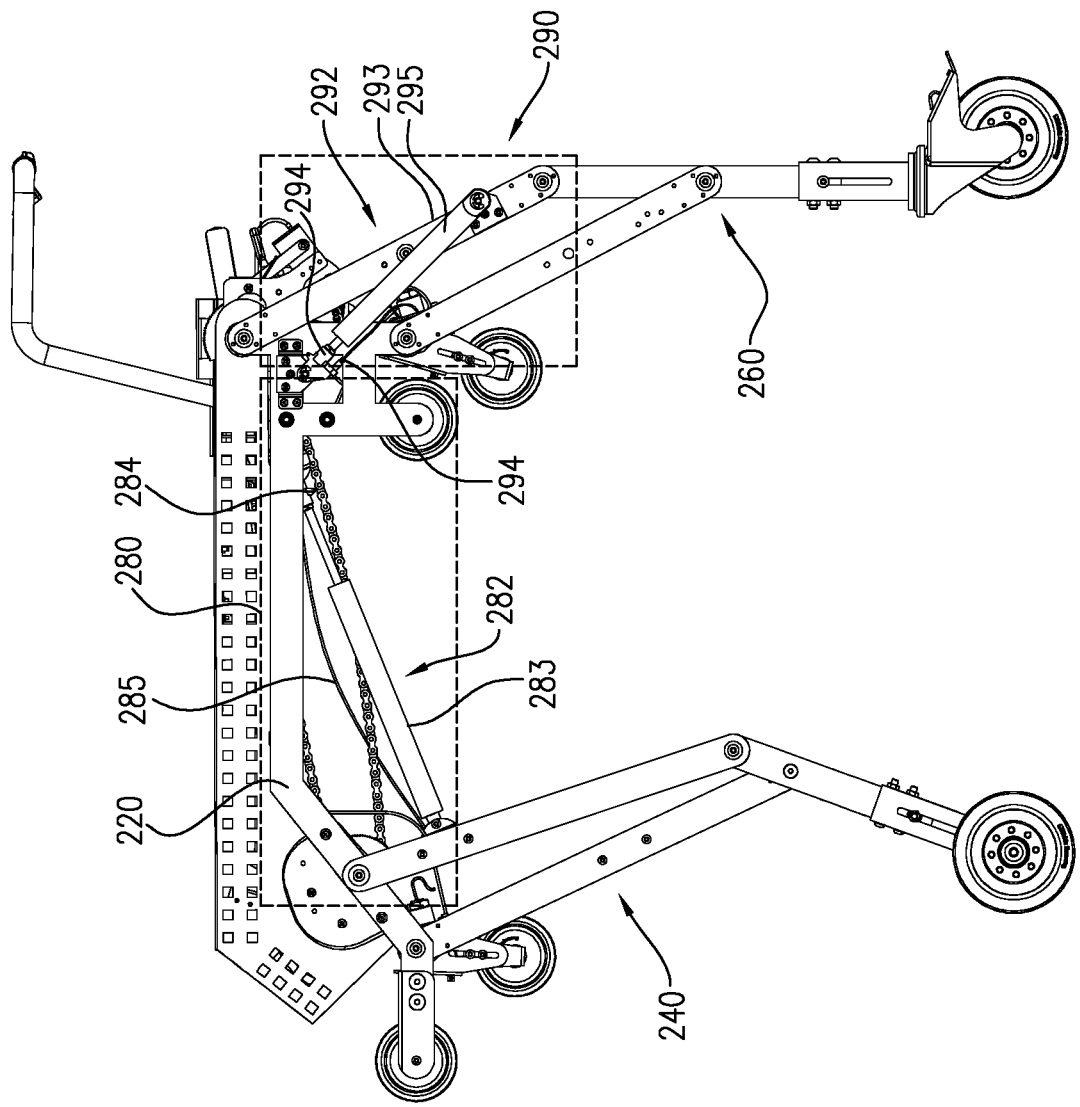
FIG. 8A is a side view of a locomotion platform in its extended position, according to a second example of the presently disclosed subject matter.
Figure 8B:
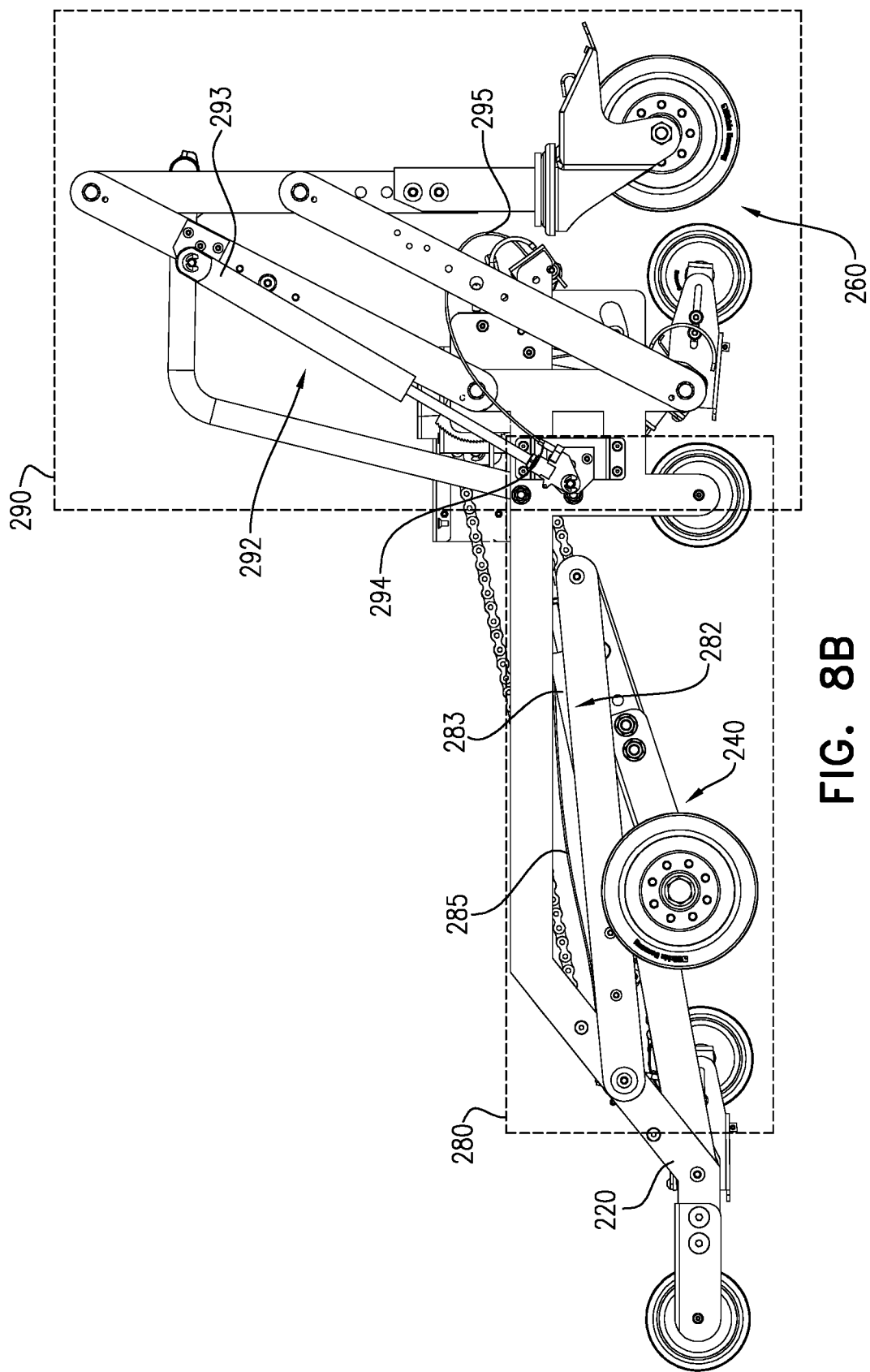
FIG. 8B illustrates the locomotion platform of FIG. 8A, in its collapsed position with a section of a base frame thereof removed for illustration purposes.

In FIGS. 8A and 8B there is illustrated a second example of the locomotion platform, according to the presently disclosed subject matter, wherein the main difference resides in the front and rear position fixing mechanisms, and wherein similar elements are designated with similar reference numbers, however shifted by 200.

As shown in this particular embodiment of the disclosed subject matter, the front and rear position fixing mechanism 280 and 290, are formed as a two-way cylinder configured to apply resistance upon manipulating the front and rear wheel assembly between the collapsed position and the extended position. The front position fixing mechanism 280 comprises a front locking mechanism 282 comprising a front maneuverable member 283, a front arresting member 284 and a front controlling module 285. The rear position fixing mechanism 290 comprises a rear locking mechanism 292 comprising a rear maneuverable member 293, a rear arresting member 294 and a rear controlling module 295. The front and rear maneuverable member 283, and 293, can be connected to their respective wheel assembly and configured to extend and retract respectively upon manipulation of the respective wheel assembly. The front maneuverable member 283 is fixedly connected to the rear top end bar 248 and the rear maneuverable member 293 may be fixedly connected to the bottom arm high bar (not shown).

As best illustrated in FIG. 8A, the front maneuverable member 283 may be formed as a two-way cylinder, having one side thereof pivotally connected to the front top end axis 46 and a second side thereof pivotally connected to the base frame 220. The front maneuverable member 283 is configurable between an extended position, at which the front wheel assembly 240 is at the extended position, and a retracted position, at which the front wheel assembly 240 is at the collapsed state. The rear maneuverable member 293 may be formed as at least one two-way cylinder, having one side thereof connected to the top arm upper axis (not shown) and a second side thereof connected to the base frame 220. The rear maneuverable member 293 is configurable between a retracted position, at which the rear wheel assembly 260 is at the extended position, and an extended position, at which the rear wheel assembly 260 is at the collapsed state.

The front arresting member 284 and the rear arresting member 294, are both comprising a fluid valve configured to arrest fluid movement at the maneuverable member, thus arresting the maneuverable member from further extending or retracting. The front controlling module 285 and the rear controlling module 295 connects the front arresting member 284 and the rear arresting member 294, respectively, to their respective activation module similarly to the first example. According to other examples, not illustrated, the front and rear position fixing mechanism 280 and 290 formed by two-way cylinders may be added to the front and rear position fixing mechanism 80 and 90 of the first example.

According to a third example, not illustrated, the front and rear position fixing mechanism 280 and 290 formed by two-way cylinders may be added to the front and rear position fixing mechanism 80 and 90 of the first example.

According to another example, not illustrated, the front and rear wheel assemblies 40 and 60, may be integrated with the front and rear position fixing mechanisms, respectively. In such example, each one of the front and rear wheel assemblies 40 and 60 comprises a respective wheel arm fitted at a bottom end with a respective riding wheel, and a break-link mechanism (a so-called collapsing link mechanism) configurable to be manipulated by the respective activating module. The break-link mechanism comprises a triangular link articulated at one end to the base frame walls 22 and pivotally linked to a first end of the position fixing mechanism which in turn is articulated at a second end thereof to the respective wheel arm. The break-link mechanism is configurable between an axially locked position, at which the position fixing mechanism is coaxially disposed with a bottom arm of the break-link mechanism and a top arm thereof disengaged from the respective activating module, and an unlocked position, at which the position fixing mechanism is pivotally displaced from the axially locked position and the top arm thereof engages the respective activating module.

Each one of the front and rear position fixing mechanisms of the particular example, are configurable between an extended position, at which the first and second ends thereof extend to a certain distance from each other, and a retracted position at which the first and second ends thereof extend to a smaller distance from each other. The front and rear position fixing mechanisms can also be configured to be arrested at any position in-between the extended and the retracted positions. In some examples, the position fixing mechanism is configured to arrest the current position thereof upon engagement of the wheel arm with the riding surface 12. Also, the position fixing mechanism can be configured to change the position thereof into a retracted position when upon pivotal displacement of the break-link mechanism towards the axially unlocked position.

The arrangement is formed such that pivotal manipulation of the respective activating module towards the respective wheel assembly entails corresponding pivotal displacement of the triangular link. The pivotal displacement of the triangular link changes the state of the position fixing mechanism to the axially unlocked state and leads to the collapsing of the break-link mechanism. Upon further pivotal manipulation, the activating module encounters the wheel arm and causing corresponding manipulation of the wheel arm towards the collapsed position. Thus, the respective activating module encounters the respective wheel assembly only after the break-link mechanism position is pivotally displaced, thus changing the state of the break-link mechanism to the axially unlocked state. It is emphasized that in this example, at the extended state the break-link mechanism of the front wheel assembly 40 supports the wheel arm and prevents spontaneous collapsing by maintaining the arrested position of the position fixing mechanism.

Pivotal manipulation of the respective activating module away from the respective wheel assembly, entails the position fixing mechanism to assume the axial locked stated thereof. In this example, the position fixing mechanism is changed to the axially locked state upon disengagement of the respective activating module from the break-link mechanism. In this example, the position fixing mechanism is formed by a double-acting cylinder being selectively arrested by the activation module. The position fixing mechanism is further configured to gradually extend towards the extended position by being pulled by the wheel arm. When the wheel arm manipulated to an extend position, the wheel arm pulls the position fixing mechanism, and extending the double-acting cylinder and enabling the wheel arm to further manipulate towards the extended position. Upon engagement of the respective riding wheel with the ground, the respective position fixing mechanism is being prevented from further extension or retraction.

The invention claimed is:

1. A locomotion platform, comprising:
   a base frame having a front lowermost section and a rear lowermost section, both defining an imaginary horizontal landing plane;
   a front wheel assembly and a rear wheel assembly, each configured with a distal end comprising one or more riding wheels and at least one proximal end articulated to said base frame, each one of said front wheel assembly and said rear wheel assembly being independently manipulable between a collapsed position, at which the riding wheels of the respective wheel assembly are disposed on or above the horizontal landing plane, and an extended position, at which the riding wheels of the respective wheel assembly are disposed below the horizontal landing plane;
   at least one position fixing mechanism configured to selectively arrest at least one of said front wheel assembly or said rear wheel assembly at any one of one or more intermediate positions between the collapsed position and the extended position; and
   at least one activating module configured to induce manipulation of at least one of said front wheel assembly and said rear wheel assembly towards the collapsed position.

2. The locomotion platform of claim 1, wherein the at least one position fixing mechanism is configured to arrest at least one of said front wheel assembly or said rear wheel assembly at any one of the intermediate positions upon manipulation towards the extended position.

3. The locomotion platform of claim 1, wherein the at least one position fixing mechanism is configured to arrest the at least one of said front wheel assembly or said rear wheel assembly upon engagement of the distal end of the respective wheel assembly with a riding surface.

4. The locomotion platform of claim 1, wherein the at least one position fixing mechanism comprises a locking mechanism configurable between a locked state, at which the locking mechanism prevents manipulation of the respective wheel assembly towards the collapsed position, and an unlocked state, at which the locking mechanism enables manipulation of the respective wheel assembly towards the extended position and towards the collapsed position.

5. The locomotion platform of claim 4, wherein the locking mechanism comprises a controlling module configured to change the state of the locking mechanism from the locked state to the unlocked state.

6. The locomotion platform of claim 4, wherein the locking mechanism comprises:

a maneuverable member connected to the respective wheel assembly and configured to maneuver respectively upon manipulation of the respective wheel assembly; and an arresting member operable by said controlling module for selectively arresting the maneuverable member.

7. The locomotion platform of claim 6, wherein the arresting member is manipulable between an arresting position associated with the locked state of the locking mechanism and at which the arresting member arrests the maneuverable member, and a releasing position associated with the unlocked state of the locking mechanism and at which the arresting member allows maneuvering of the maneuverable member.

8. The locomotion platform of claim 5, wherein the at least one activating module is configured to actuate said controlling module to change the state of the locking mechanism from the locked state to the unlocked state.

9. The locomotion platform of claim 8, wherein the change of the state of the locking mechanism from the locked state to the unlocked state by the at least one activating module is performed prior to a successive manipulation of at least one of said front wheel assembly or said rear wheel assembly towards the collapsed position.

10. The locomotion platform of claim 9, wherein said at least one activating module is configured to maintain the locking mechanism at the unlocked state during the successive manipulation of the at least one of said front wheel assembly or said rear wheel assembly towards the collapsed position.

11. The locomotion platform of claim 1, wherein the at least one activating module comprises a manipulating module, configured to manipulate the at least one of said front wheel assembly or said rear wheel assembly towards the collapsed position upon engaging a barrier top surface.

12. The locomotion platform of claim 11, wherein the at least one position fixing mechanism comprises a locking mechanism configurable between a locked state, at which the locking mechanism prevents manipulation of the respective wheel assembly towards the collapsed position, and an unlocked state, at which the locking mechanism enables manipulation of the respective wheel assembly towards the extended position and towards the collapsed position; and wherein the activating module is configurable between:
   a free state, at which the activating module is disengaged from the barrier top surface, and the locking mechanism is at the locked state;
   an engaged state, at which the activating module engages the barrier top surface and the activating module change the state of the locking mechanism from the locked state to the unlocked state;
   a manipulating state, at which the activating module engages the barrier top surface, maintains the unlocked state of the locking mechanism and the manipulating module manipulates the respective wheel assembly to be maneuvered to a position between the extended position and the collapsed position; and
   a collapsed state, at which the activating module engages the barrier top surface, maintains the unlocked state of the locking mechanism and the manipulating module is restricted from further manipulation of the respective wheel assembly to the collapsed position.

13. The locomotion platform of claim 12, wherein the activating module is configured to automatically and sequentially change the state thereof from said free state, through engaged state and manipulating state to the collapsed state upon engaging the barrier top surface.

14. The locomotion platform of claim 12, wherein upon disengagement of the activating module from the barrier top surface, the activating module is automatically configured to sequentially assume said free state, so as to cause the at least one position fixing mechanism to arrest the respective wheel assembly at any one of the intermediate positions or the extended position upon engaging a riding surface.

15. The locomotion platform of claim 12, wherein the manipulating module comprises an activating arm pivotally connected to either one of the base frame or the respective wheel assembly, the activating arm is positioned in front of the respective wheel assembly, and the activating arm being configured to pivot towards a pushing member fixedly connected to the respective wheel assembly upon the engagement with the barrier top surface.

16. The locomotion platform of claim 15, wherein:
   at the free state, the activating arm is disengaged from the barrier top surface and at least partially disengaged from the pushing member of the respective wheel assembly;
   at the engaged state, the activating arm is further manipulated towards the pushing member with respect to its position at the free state and engaging an engagement surface of the pushing member so as to change the state of the locking mechanism from the locked state to the unlocked state;
   at the manipulating state, the activating arm is further manipulated with respect to its position at the engaged state together with the pushing member, so as to manipulate the respective wheel assembly to a position between the extended position and the collapsed position; and
   at the collapsed state, the activating arm is further manipulated with respect to its position at the manipulating state together with pushing member, located above the horizontal landing plane and is restricted from further manipulation.

17. The locomotion platform of claim 1, wherein the at least one position fixing mechanism comprises a front position fixing mechanism for arresting the front wheel assembly and a rear position fixing mechanism for arresting the rear wheel assembly, and wherein said front position fixing mechanism and said rear position fixing mechanism are configured to operate independently.

18. The locomotion platform of claim 1, wherein the front lowermost section comprises one or more front landing wheels and the rear lowermost section comprises one or more rear landing wheels equi-leveled with the one or more front landing wheels, and wherein bottom sections of said front landing wheels and said rear landing wheels define said horizontal landing plane.

19. The locomotion platform of claim 1, wherein the position fixing mechanism further comprises a safety mechanism operable with the at least one position fixing mechanism for selectively arresting any one of the front wheel assembly and the rear wheel assembly at any one of the intermediate positions.

20. The locomotion platform of claim 1, further comprising at least one position manipulation mechanism configured to selectively manipulate at least one of said front wheel assembly and said rear wheel assembly to any position between the collapsed position and the extended position.

* * * * *